United States Patent
Xie et al.

(10) Patent No.: US 12,363,229 B2
(45) Date of Patent: Jul. 15, 2025

(54) VOICE CALL TRANSFER METHOD AND ELECTRONIC DEVICE

(71) Applicant: Huawei Technologies Co., Ltd., Shenzhen (CN)

(72) Inventors: Yu Xie, Shenzhen (CN); Xiaohua Zhou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 510 days.

(21) Appl. No.: 17/896,628

(22) Filed: Aug. 26, 2022

(65) Prior Publication Data

US 2022/0408321 A1  Dec. 22, 2022

Related U.S. Application Data

(63) Continuation of application No. PCT/CN2020/134615, filed on Dec. 8, 2020.

(30) Foreign Application Priority Data

Feb. 29, 2020   (CN) .......................... 202010132506.3

(51) Int. Cl.
    H04W 36/00   (2009.01)
    H04M 7/00    (2006.01)
    H04W 4/16    (2009.01)

(52) U.S. Cl.
    CPC ........... *H04M 7/0006* (2013.01); *H04W 4/16* (2013.01); *H04W 36/00224* (2023.05)

(58) Field of Classification Search
    CPC .. H04M 7/0006; H04M 3/42263; H04M 3/58; H04M 1/72469; H04M 2250/06; H04M 1/72412; H04M 1/72403; H04M 1/72448; H04W 4/16; H04W 36/00224; H04W 84/12
    USPC ........................................................ 455/436
    See application file for complete search history.

(56) References Cited

U.S. PATENT DOCUMENTS

| | | | |
|---|---|---|---|
| 6,345,093 B1 * | 2/2002 | Lee ..................... | H04M 3/5237 379/212.01 |
| 6,618,384 B1 * | 9/2003 | Elliott .................. | H04W 88/14 370/395.6 |
| 7,088,990 B1 * | 8/2006 | Isomursu .......... | H04M 1/72403 455/420 |
| 7,623,885 B2 * | 11/2009 | Vaittinen ............. | H04W 52/286 370/328 |

(Continued)

FOREIGN PATENT DOCUMENTS

| CN | 101018151 A | 8/2007 |
|---|---|---|
| CN | 102202123 A | 9/2011 |

(Continued)

*Primary Examiner* — Amancio Gonzalez
(74) *Attorney, Agent, or Firm* — Conley Rose, P.C.

(57) ABSTRACT

A voice call transfer method includes when a target device receives an incoming voice call as a called party, displaying, on a call application interface, a device identifier of a first device that can perform voice call transfer, receiving a selection operation performed on the device identifier, triggering the target device to enter a voice call transfer mode, and sending first voice data from a calling party device to the first device when it is determined that the target device performs a voice call with the calling party device and is in the voice call transfer mode, so that the first device plays the first voice data.

20 Claims, 14 Drawing Sheets

When a target device receives an incoming voice call as a called party, display, on a call application interface of the target device, a device identifier of a first device that can perform voice call transfer — S11

Receive a selection operation performed on the device identifier, and trigger the target device to enter a voice call transfer mode — S12

Send first voice data from a calling party device to the first device when it is determined that the target device performs the voice call with the calling party device and is in the voice call transfer mode, so that the first device plays the first voice data — S13

(56) References Cited

U.S. PATENT DOCUMENTS

| | | | | |
|---|---|---|---|---|
| 7,769,407 | B2* | 8/2010 | Lundell | H04W 52/346 |
| | | | | 455/450 |
| 8,160,494 | B2* | 4/2012 | Tysowski | H04W 12/069 |
| | | | | 455/418 |
| 8,732,246 | B2* | 5/2014 | Jayanthi | H04L 51/066 |
| | | | | 709/205 |
| 9,319,300 | B2* | 4/2016 | Huynh Van | H04L 12/4641 |
| 9,622,057 | B1* | 4/2017 | Qu | H04L 65/1104 |
| 10,992,554 | B2* | 4/2021 | Tofighbakhsh | H04L 43/04 |
| 11,483,359 | B2* | 10/2022 | Deng | H04L 65/1069 |
| 2007/0286370 | A1* | 12/2007 | Kauppinen | H04M 1/575 |
| | | | | 379/142.01 |
| 2008/0287104 | A1* | 11/2008 | Sundberg | H04L 12/66 |
| | | | | 455/412.1 |
| 2012/0099719 | A1* | 4/2012 | Erb | H04M 3/436 |
| | | | | 379/211.01 |
| 2013/0157636 | A1 | 6/2013 | Ryan | |
| 2014/0289646 | A1* | 9/2014 | Munir | H04L 65/1093 |
| | | | | 715/753 |
| 2016/0309034 | A1 | 10/2016 | Li | |
| 2017/0180957 | A1* | 6/2017 | Lakkis | H04M 3/42076 |
| 2024/0118713 | A1* | 4/2024 | Dean | G05D 1/247 |

FOREIGN PATENT DOCUMENTS

| | | |
|---|---|---|
| CN | 102291502 A | 12/2011 |
| CN | 103152715 A | 6/2013 |
| CN | 103167433 A | 6/2013 |
| CN | 103975634 A | 8/2014 |
| CN | 105228118 A | 1/2016 |
| CN | 105682064 A | 6/2016 |
| CN | 205408169 U | 7/2016 |
| CN | 106603498 A | 4/2017 |
| CN | 107708078 A | 2/2018 |
| CN | 107920160 A | 4/2018 |
| CN | 108881779 A | 11/2018 |
| CN | 110138937 A | 8/2019 |
| CN | 110191241 A | 8/2019 |
| CN | 110418299 A | 11/2019 |
| CN | 110708430 A | 1/2020 |
| CN | 110719371 A | 1/2020 |

* cited by examiner

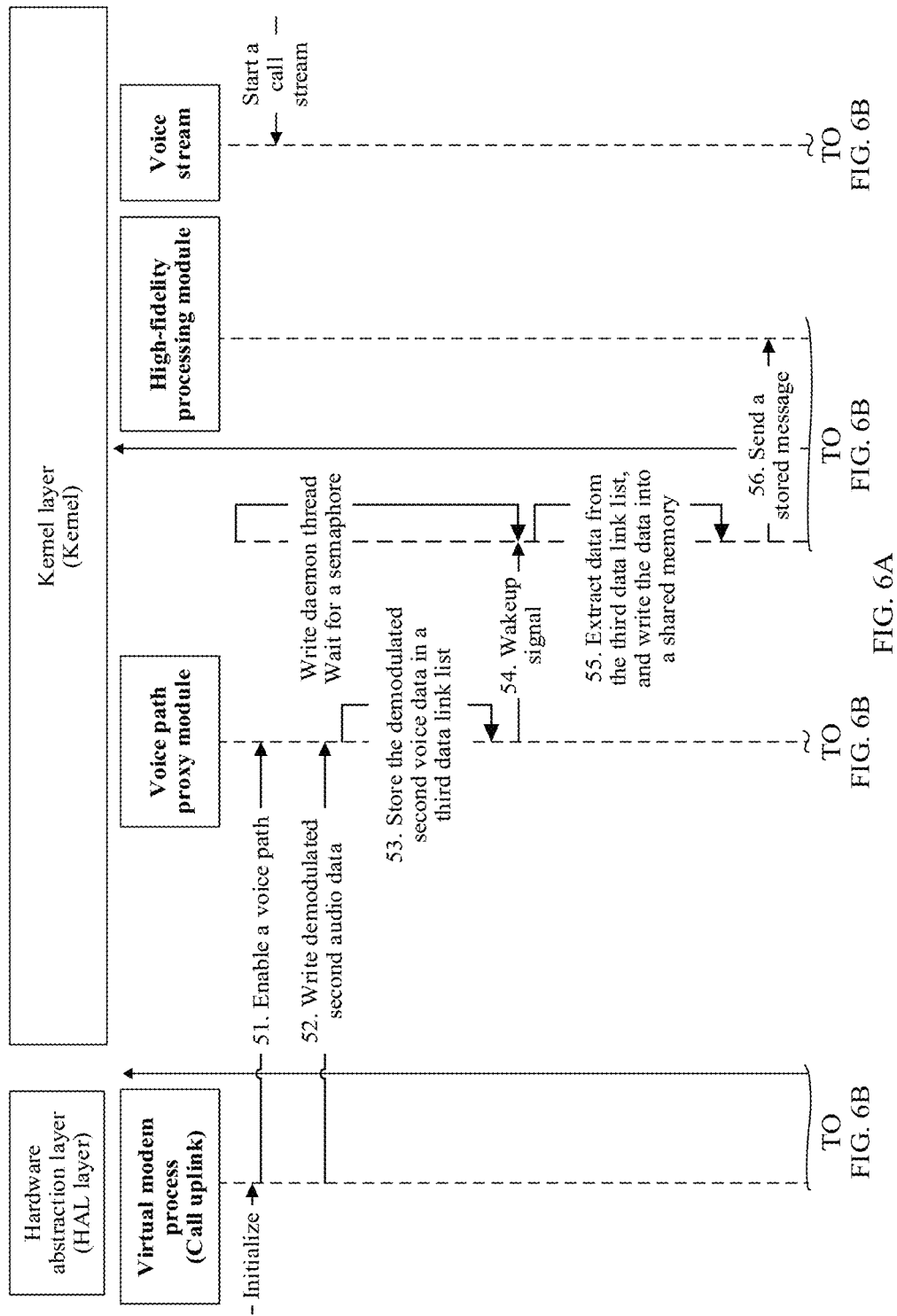

CONT. FROM FIG. 6A

57. Extract data from the shared memory, and store processed data in a fourth data link list Read 58. Data obtaining request 59. Extract to-be-modulated second voice data in the fourth data link list 60. Return the to-be-modulated second voice data Read Invoke every 20 ms

CONT. FROM FIG. 6A

CONT. FROM FIG. 6A

Invoke every 20 ms

FIG. 6B

VOICE CALL TRANSFER METHOD AND ELECTRONIC DEVICE

CROSS-REFERENCE TO RELATED APPLICATIONS

This is a continuation of International Patent Application No. PCT/CN2020/134615 filed on Dec. 8, 2020, which claims priority to Chinese Patent Application No. 202010132506.3 filed on Feb. 29, 2020. The disclosures of the aforementioned applications are hereby incorporated by reference in their entireties.

TECHNICAL FIELD

This disclosure relates to the field of voice call technologies, and in particular, to a voice call transfer method and an electronic device.

BACKGROUND

With continuous advancement of science and technology, a user can implement a voice call through a cellular network by using an electronic device such as a mobile phone or a tablet. However, due to requirements of different use scenarios such as activities and work of the user, in a related technology, a mobile phone may be connected to a BLUETOOTH headset for a voice call by using a BLUETOOTH technology, or a mobile phone may be connected to a device such as a sound box for a voice call by using a BLUETOOTH technology. However, limited by a distance between the BLUETOOTH headset and the mobile phone and a BLUETOOTH data transmission rate, it is difficult to transfer the voice call by using the BLUETOOTH technology to meet a requirement of the user for voice quality of the voice call. In addition, protocol incompatibility also exists when the voice call is performed between different devices through BLUETOOTH, and consequently, it is difficult to meet a requirement of the user for performing the voice call by using the different electronic devices.

SUMMARY

In view of this, to resolve the foregoing technical problem, this disclosure provides a voice call transfer method, an apparatus, an electronic device, a system, a computer storage medium, and a computer program product.

According to one aspect of embodiments of this disclosure, a voice call transfer method is provided. The method includes: when a target device receives an incoming voice call as a called party, displaying, on a call application interface of the target device, a device identifier of a first device that can perform voice call transfer, where the call application interface further includes a first button used to answer the incoming voice call and a second button used to reject the incoming voice call; receiving a selection operation performed on the device identifier, and triggering the target device to enter a voice call transfer mode; and sending first voice data from a calling party device to the first device when it is determined that the target device performs a voice call with the calling party device and is in the voice call transfer mode, so that the first device plays the first voice data.

According to the voice call transfer method provided in this embodiment of this disclosure, when receiving the incoming voice call, the target device transfers the voice call between the target device and the calling party device to the first device based on a user selection, so that a user needs to perform fewer operations with great convenience, and voice data transmitted in a voice call process has high quality and a high transmission speed. In addition, the method is applicable to voice call transfer between various devices.

In a possible implementation, the method further includes: determining, based on information about the target device, a first device that meets a voice call transfer condition and a device identifier of the first device before the device identifier is displayed.

The voice call transfer condition includes: a login account of the first device is the same as a login account of the target device, and the first device has functions of voice data playing and voice data collection.

In the foregoing manner, screening may be performed on electronic devices that can be connected to the target device, to ensure that each first device provided for the user can perform voice call transfer.

In a possible implementation, the sending first voice data from a calling party device to the first device when it is determined that the target device performs a voice call with the calling party device and is in the voice call transfer mode includes: sending processed first voice data to the first device after demodulation and high-fidelity (Hi-Fi) processing are performed on the received first voice data.

The foregoing manner can ensure quality of voice played by the first device, and meet a high-quality auditory requirement of the user.

In a possible implementation, the method further includes: controlling the target device to establish WI-FI direct with the first device after the voice call transfer mode is triggered.

The sending first voice data from a calling party device to the first device includes: sending the first voice data to the first device through the WI-FI direct.

In the foregoing manner, voice data may be transmitted between the target device and the first device through the WI-FI direct, to improve transmission efficiency and a transmission speed.

In a possible implementation, the method further includes: forwarding second voice data to the calling party device when the second voice data is received from the first device, so that the calling party device plays the second voice data.

The second voice data is obtained by the first device by collecting data of voice in an environment in which the first device is located.

In the foregoing manner, the second voice data collected by the first device may be forwarded to the calling party device, to implement uplink data transmission during voice call transfer.

In a possible implementation, the forwarding second voice data to the calling party device when the second voice data is received from the first device includes: sending processed second voice data to the calling party device after demodulation and Hi-Fi processing are performed on the second voice data.

The foregoing manner can ensure quality of voice played by the calling party device, and meet a high-quality auditory requirement of the user.

In a possible implementation, the determining, based on information about the target device, a first device that meets a voice call transfer condition and a device identifier of the first device before the device identifier is displayed includes: enabling a virtual device management module of the target device before the device identifier is displayed; sending, by using the virtual device management module, a device query request to an intelligent management system in which the target device is located, so that the intelligent management system determines, in response to the device query request, the first device that meets the voice call transfer condition; and receiving, by using the virtual device management module, information about the first device that is sent by the intelligent management system, where the information about the first device includes the device identifier of the first device.

The voice call transfer condition further includes: the first device is provided with the virtual device management module.

In the foregoing manner, a speed and efficiency of determining the first device that meets the voice call transfer condition may be improved by using the intelligent management system.

In a possible implementation, the controlling the target device to establish WI-FI direct with the first device after the voice call transfer mode is triggered includes: enabling a virtual modem in the target device by using a virtual device management module of the target device, and controlling the virtual modem to establish WI-FI direct with the first device.

In a possible implementation, the controlling the virtual modem to establish WI-FI direct with the first device includes: sending, by using the virtual device management module, a connection request for the first device to an intelligent management system in which the target device is located, so that the intelligent management system invokes a connection interface based on the connection request to establish the WI-FI direct.

The foregoing manner can simplify a step of establishing the WI-FI direct between the target device and the first device, and improve a speed and efficiency of establishing the WI-FI direct.

In a possible implementation, the triggering the target device to enter a voice call transfer mode includes: enabling a demodulation function and a modulation function of a virtual modem of the target device for audio data by using a virtual device management module of the target device, to enable the virtual modem; and when it is determined that the virtual modem is enabled and the target device is in a voice call state, determining to trigger the target device to enter the voice call transfer mode.

In the foregoing manner, the virtual modem is enabled to trigger the voice call transfer mode, to ensure stable and reliable running of voice call transfer between the target device and the first device.

In a possible implementation, the sending processed first voice data to the first device after demodulation and Hi-Fi processing are performed on the received first voice data includes: demodulating the first voice data by using a modem of the target device, to obtain demodulated first voice data; processing the demodulated first voice data by using a Hi-Fi processing module of the target device, to obtain processed first voice data; and sending modulated first voice data to the first device after the processed first voice data is modulated by using a virtual modem of the target device.

The foregoing manner can ensure quality of voice played by the first device, and meet a high-quality auditory requirement of the user.

In a possible implementation, the sending processed second voice data to the calling party device after demodulation and Hi-Fi processing are performed on the second voice data includes: demodulating the second voice data by using a virtual modem of the target device, to obtain demodulated second voice data; processing the demodulated second voice data by using a Hi-Fi processing module of the target device, to obtain to-be-modulated second voice data; and modulating the to-be-modulated second voice data by using a modem of the target device, to obtain processed second voice data, and sending the processed second voice data to the calling party device.

The foregoing manner can ensure quality of voice played by the calling party device, and meet a high-quality auditory requirement of the user.

According to another aspect of embodiments of this disclosure, a method for performing voice call transfer between a target device and a first device is provided. The method includes:

The target device receives an incoming voice call as a called party.

A device identifier of the first device that can perform voice call transfer is displayed on a call application interface of the target device, where the call application interface further includes a first button used to answer the incoming voice call and a second button used to reject the incoming voice call.

The target device receives a selection operation performed on the device identifier, and triggers the target device to enter a voice call transfer mode.

The target device sends first voice data from a calling party device to the first device when the target device performs a voice call with the calling party device and is in the voice call transfer mode.

The first device receives and plays the first voice data.

In a possible implementation, the method further includes:

The target device sends a notification indication to a pre-determined first device after detecting that the target device receives the incoming voice call as the called party.

The first device sends an incoming call notification in response to the notification indication.

The first device sends a voice call transfer request to the target device in response to a detected answer determining operation.

The target device triggers the target device to enter the voice call transfer mode when receiving the voice call transfer request.

In the foregoing manner, a user may respond to the incoming voice call by using the first device, to facilitate a voice call of the user.

In a possible implementation, that the target device forwards second voice data to the calling party device when receiving the second voice data includes:

The target device sends processed second voice data to the calling party device after performing demodulation and Hi-Fi processing on the second voice data.

In a possible implementation, that the target device determines, based on information about the target device, a first device that meets a voice call transfer condition and a device identifier of the first device before displaying the device identifier includes:

The target device enables a virtual device management module of the target device before displaying the device identifier.

The target device sends, by using the virtual device management module, a device query request to an intelligent management system in which the target device is located, so that the intelligent management system determines, in response to the device query request, the first device that meets the voice call transfer condition.

The target device receives, by using the virtual device management module, information about the first device that is sent by the intelligent management system, where the information about the first device includes the device identifier of the first device.

The voice call transfer condition further includes: the first device is provided with the virtual device management module.

In a possible implementation, that the target device establishes WI-FI direct with the first device after triggering the voice call transfer mode includes:

The target device enables a virtual modem in the target device by using a virtual device management module, and controls the virtual modem to establish WI-FI direct with the first device.

In a possible implementation, the controlling the virtual modem to establish WI-FI direct with the first device includes:

The target device sends, by using the virtual device management module, a connection request for the first device to an intelligent management system in which the target device is located, so that the intelligent management system invokes a connection interface based on the connection request to establish the WI-FI direct.

In a possible implementation, that the target device receives a selection operation performed on the device identifier, and triggers the target device to enter a voice call transfer mode includes:

The target device enables a demodulation function and a modulation function of a virtual modem of the target device for audio data by using a virtual device management module, to enable the virtual modem.

When determining that the virtual modem is enabled and the target device is in a voice call state, the target device determines to trigger the target device to enter the voice call transfer mode.

In a possible implementation, that the target device sends processed first voice data to the first device after performing demodulation and Hi-Fi processing on the received first voice data includes:

The target device demodulates the first voice data by using a modem, to obtain demodulated first voice data.

The target device processes the demodulated first voice data by using a Hi-Fi processing module, to obtain processed first voice data.

The target device sends modulated first voice data to the first device after modulating the processed first voice data by using a virtual modem.

In a possible implementation, that the target device sends processed second voice data to the calling party device after performing demodulation and Hi-Fi processing on the second voice data includes:

The target device demodulates the second voice data by using a virtual modem, to obtain demodulated second voice data.

The target device processes the demodulated second voice data by using a Hi-Fi processing module, to obtain to-be-modulated second voice data.

The target device modulates the to-be-modulated second voice data by using a modem, to obtain processed second voice data, and sends the processed second voice data to the calling party device.

According to one aspect of embodiments of this disclosure, an electronic device is provided. The electronic device includes: a display; one or more processors; and one or more memories.

The one or more memories store one or more computer programs, the one or more computer programs include instructions, and when the instructions are executed by the one or more processors, the electronic device is used as a target device to perform the following steps: when the target device receives an incoming voice call as a called party, displaying, on a display call application interface of the target device, a device identifier of a first device that can perform voice call transfer, where the call application interface further includes a first button used to answer the incoming voice call and a second button used to reject the incoming voice call; receiving a selection operation performed on the device identifier, and triggering the target device to enter a voice call transfer mode; and sending first voice data from a calling party device to the first device when it is determined that the target device performs a voice call with the calling party device and is in the voice call transfer mode, so that the first device plays the first voice data.

In a possible implementation, when the instructions are executed by the one or more processors, the electronic device is used as the target device to perform the following step: determining, based on information about the target device, a first device that meets a voice call transfer condition and a device identifier of the first device before the device identifier is displayed.

The voice call transfer condition includes: a login account of the first device is the same as a login account of the target device, and the first device has functions of voice data playing and voice data collection.

In a possible implementation, when the instructions are executed by the one or more processors, the electronic device is used as the target device to perform the following step: sending processed first voice data to the first device after demodulation and Hi-Fi processing are performed on the received first voice data.

In a possible implementation, when the instructions are executed by the one or more processors, the electronic device is used as the target device to perform the following step: controlling the target device to establish WI-FI direct with the first device after the voice call transfer mode is triggered.

The sending first voice data from a calling party device to the first device includes: sending the first voice data to the first device through the WI-FI direct.

In a possible implementation, when the instructions are executed by the one or more processors, the electronic device is used as the target device to perform the following step: forwarding second voice data to the calling party device when the second voice data is received from the first device, so that the calling party device plays the second voice data.

The second voice data is obtained by the first device by collecting data of voice in an environment in which the first device is located.

In a possible implementation, when the instructions are executed by the one or more processors, the electronic device is used as the target device to perform the following step: sending processed second voice data to the calling party device after demodulation and Hi-Fi processing are performed on the second voice data.

In a possible implementation, when the instructions are executed by the one or more processors, the electronic device is used as the target device to perform the following steps: enabling a virtual device management module of the target device before the device identifier is displayed; sending, by using the virtual device management module, a device query request to an intelligent management system in which the target device is located, so that the intelligent management system determines, in response to the device query request, the first device that meets the voice call transfer condition; and receiving, by using the virtual device management module, information about the first device that is sent by the intelligent management system, where the information about the first device includes the device identifier of the first device.

The voice call transfer condition further includes: the first device is provided with the virtual device management module.

In a possible implementation, when the instructions are executed by the one or more processors, the electronic device is used as the target device to perform the following step: enabling a virtual modem in the target device by using a virtual device management module of the target device, and controlling the virtual modem to establish WI-FI direct with the first device.

In a possible implementation, when the instructions are executed by the one or more processors, the electronic device is used as the target device to perform the following step: sending, by using the virtual device management module, a connection request for the first device to an intelligent management system in which the target device is located, so that the intelligent management system invokes a connection interface based on the connection request to establish the WI-FI direct.

In a possible implementation, when the instructions are executed by the one or more processors, the electronic device is used as the target device to perform the following steps: enabling a demodulation function and a modulation function of a virtual modem of the target device for audio data by using a virtual device management module of the target device, to enable the virtual modem; and when it is determined that the virtual modem is enabled and the target device is in a voice call state, determining to trigger the target device to enter the voice call transfer mode.

In a possible implementation, when the instructions are executed by the one or more processors, the electronic device is used as the target device to perform the following steps: demodulating the first voice data by using a modem of the target device, to obtain demodulated first voice data; processing the demodulated first voice data by using a Hi-Fi processing module of the target device, to obtain processed first voice data; and sending modulated first voice data to the first device after the processed first voice data is modulated by using a virtual modem of the target device.

In a possible implementation, when the instructions are executed by the one or more processors, the electronic device is used as the target device to perform the following steps: demodulating the second voice data by using a virtual modem of the target device, to obtain demodulated second voice data; processing the demodulated second voice data by using a Hi-Fi processing module of the target device, to obtain to-be-modulated second voice data; and modulating the to-be-modulated second voice data by using a modem of the target device, to obtain processed second voice data, and sending the processed second voice data to the calling party device.

According to one aspect of this disclosure, a voice call transfer system is provided. The system includes a target device and a first device.

The target device includes: a display; one or more first processors; and one or more first memories.

The one or more first memories store one or more computer programs, the one or more computer programs include instructions, and when the instructions are executed by the one or more first processors, the target device is enabled to perform the following steps:

The target device receives an incoming voice call as a called party.

A device identifier of the first device that can perform voice call transfer is displayed on a call application interface of the target device, where the call application interface further includes a first button used to answer the incoming voice call and a second button used to reject the incoming voice call.

The target device receives a selection operation performed on the device identifier, and triggers the target device to enter a voice call transfer mode.

The target device sends first voice data from a calling party device to the first device when the target device performs a voice call with the calling party device and is in the voice call transfer mode.

The first device includes: one or more second processors; and one or more second memories.

The one or more second memories store one or more computer programs, the one or more computer programs include instructions, and when the instructions are executed by the one or more second processors, the first device is enabled to perform the following step:

The first device receives and plays the first voice data.

In a possible implementation, when the instructions are executed by the one or more first processors, the target device is enabled to perform the following step: The target device sends a notification indication to a pre-determined first device after detecting that the target device receives the incoming voice call as the called party.

When the instructions are executed by the one or more second processors, the first device is enabled to perform the following steps:

The first device sends an incoming call notification in response to the notification indication.

The first device sends a voice call transfer request to the target device in response to a detected answer determining operation.

When the instructions are executed by the one or more first processors, the target device is enabled to perform the following step: The target device triggers the target device to enter the voice call transfer mode when receiving the voice call transfer request.

In a possible implementation, when the instructions are executed by the one or more first processors, the target device is enabled to perform the following step:

The target device determines, based on information about the target device, a first device that meets a voice call transfer condition and a device identifier of the first device before displaying the device identifier.

The voice call transfer condition includes: a login account of the first device is the same as a login account of the target device, and the first device has functions of voice data playing and voice data collection.

In a possible implementation, when the instructions are executed by the one or more first processors, the target device is enabled to perform the following step:

The target device sends processed first voice data to the first device after performing demodulation and Hi-Fi processing on the received first voice data.

In a possible implementation, when the instructions are executed by the one or more first processors, the target device is enabled to perform the following step:

The target device establishes WI-FI direct with the first device after triggering the voice call transfer mode, so that the target device sends the first voice data to the first device through the WI-FI direct.

In a possible implementation, when the instructions are executed by the one or more second processors, the target device is enabled to perform the following steps:

The first device collects data of voice in an environment in which the first device is located, to obtain second voice data.

The first device sends the second voice data to the target device.

When the instructions are executed by the one or more first processors, the target device is enabled to perform the following step:

The target device forwards the second voice data to the calling party device when receiving the second voice data, so that the calling party device plays the second voice data.

In a possible implementation, when the instructions are executed by the one or more first processors, the target device is enabled to perform the following step:

The target device sends processed second voice data to the calling party device after performing demodulation and Hi-Fi processing on the second voice data.

In a possible implementation, when the instructions are executed by the one or more first processors, the target device is enabled to perform the following steps:

The target device enables a virtual device management module of the target device before displaying the device identifier.

The target device sends, by using the virtual device management module, a device query request to an intelligent management system in which the target device is located, so that the intelligent management system determines, in response to the device query request, the first device that meets the voice call transfer condition.

The target device receives, by using the virtual device management module, information about the first device that is sent by the intelligent management system, where the information about the first device includes the device identifier of the first device.

The voice call transfer condition further includes: the first device is provided with the virtual device management module.

In a possible implementation, when the instructions are executed by the one or more first processors, the target device is enabled to perform the following steps:

The target device enables a virtual modem in the target device by using a virtual device management module, and controls the virtual modem to establish WI-FI direct with the first device.

In a possible implementation, when the instructions are executed by the one or more first processors, the target device is enabled to perform the following step:

The target device sends, by using the virtual device management module, a connection request for the first device to an intelligent management system in which the target device is located, so that the intelligent management system invokes a connection interface based on the connection request to establish the WI-FI direct.

In a possible implementation, when the instructions are executed by the one or more first processors, the target device is enabled to perform the following steps:

The target device enables a demodulation function and a modulation function of a virtual modem of the target device for audio data by using a virtual device management module, to enable the virtual modem.

When determining that the virtual modem is enabled and the target device is in a voice call state, the target device determines to trigger the target device to enter the voice call transfer mode.

In a possible implementation, when the instructions are executed by the one or more first processors, the target device is enabled to perform the following steps:

The target device demodulates the first voice data by using a modem, to obtain demodulated first voice data.

The target device processes the demodulated first voice data by using a Hi-Fi processing module, to obtain processed first voice data.

The target device sends modulated first voice data to the first device after modulating the processed first voice data by using a virtual modem.

In a possible implementation, when the instructions are executed by the one or more first processors, the target device is enabled to perform the following steps:

The target device demodulates the second voice data by using a virtual modem, to obtain demodulated second voice data.

The target device processes the demodulated second voice data by using a Hi-Fi processing module, to obtain to-be-modulated second voice data.

The target device modulates the to-be-modulated second voice data by using a modem, to obtain processed second voice data, and sends the processed second voice data to the calling party device.

According to one aspect of embodiments of this disclosure, a voice call transfer apparatus is provided. The apparatus is configured to perform the foregoing voice call transfer method.

According to one aspect of embodiments of this disclosure, an apparatus for performing voice call transfer between a target device and a first device. The apparatus is configured to perform the foregoing method for performing the voice call transfer between the target device and the first device.

According to one aspect of embodiments of this disclosure, a computer storage medium is provided, including computer instructions. When the computer instructions are run on a mobile device, the mobile device is enabled to perform the foregoing voice call transfer method.

According to one aspect of embodiments of this disclosure, a computer storage medium is provided, including computer instructions. When the computer instructions are run on a mobile device, the mobile device is enabled to perform the foregoing method for performing the voice call transfer between the target device and the first device.

According to one aspect of embodiments of this disclosure, a computer program product is provided. When the computer program product runs on a computer, the computer is enabled to perform the foregoing voice call transfer method.

According to one aspect of embodiments of this disclosure, a computer program product is provided. When the computer program product runs on a computer, the computer is enabled to perform the foregoing method for performing the voice call transfer between the target device and the first device.

Example embodiments are described in detail with reference to accompanying drawings to make other features and aspects of this disclosure clearer.

BRIEF DESCRIPTION OF DRAWINGS

The accompanying drawings included in this specification and constituting a part of this specification and this specification jointly show example embodiments, features, and aspects of this disclosure, and are intended to explain the principles of this disclosure.

FIG. 6A and FIG. 6B are a schematic diagram of a virtual call uplink procedure in a voice call transfer method according to an embodiment of this disclosure.

DESCRIPTION OF EMBODIMENTS

The following describes various example embodiments, features, and aspects of this disclosure in detail with reference to the accompanying drawings. Identical reference signs in the accompanying drawings indicate elements that have same or similar functions. Although various aspects of embodiments are shown in the accompanying drawings, unless otherwise specified, the accompanying drawings do not need to be drawn to scale.

The specific term "example" herein means "used as an example, embodiment or illustration". Any embodiment described as an "example" is not necessarily explained as being superior or better than other embodiments.

In addition, to better describe this disclosure, numerous specific details are given in the following specific implementations. A person skilled in the art should understand that this disclosure can also be implemented without some specific details. In some embodiments, methods, means, elements and circuits that are well-known to a person skilled in the art are not described in detail, so that the subject matter of this disclosure is highlighted.

In a related technology, a user may perform a voice call by using a headset connected to an electronic device such as a mobile phone through BLUETOOTH. However, because a transmission rate of BLUETOOTH communication is low, audio quality of the voice call is greatly limited, and high-quality audio cannot be transmitted. In addition, the voice call can be performed only within a short distance (a maximum transmission distance is 10 meters (m)) through BLUETOOTH communication, and requirements of the user in different use scenarios cannot be met. Moreover, because communication quality of BLUETOOTH communication is greatly affected by blocking of a human body, clothing, a building, furniture, and the like, it is difficult to maintain user requirements for high quality and convenience of the voice call. According to a voice call transfer method, an apparatus, and an electronic device provided in embodiments of this disclosure, a voice call between a target device and a calling party device is transferred to a first device. The method, apparatus, and electronic device are applicable to voice call transfer between various types of devices and can be widely used, a user needs to perform fewer operations with great strong convenience, and voice data transmitted and played in a voice call process has high quality and a high transmission speed.

Figure 1:
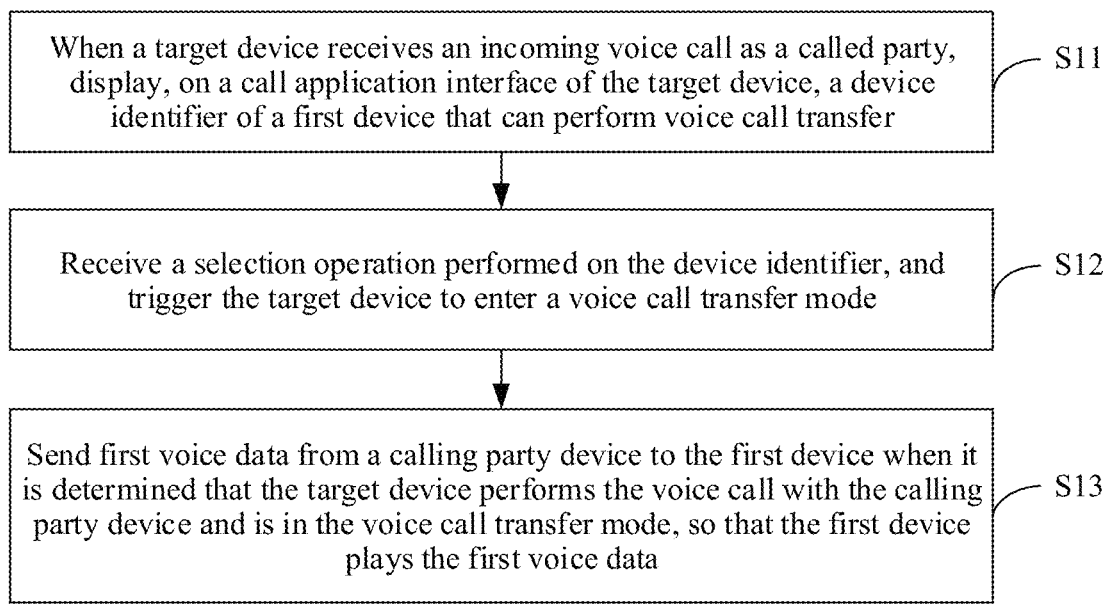
FIG. 1 is a flowchart of a voice call transfer method according to an embodiment of this disclosure.

FIG. 1 is a flowchart of a voice call transfer method according to an embodiment of this disclosure. The method is applied to a target device. As shown in FIG. 1, the method includes step S11 to step S13.

In step S11, when the target device receives an incoming voice call as a called party, the target device displays, on a call application interface of the target device, a device identifier of a first device that can perform voice call transfer. The call application interface further includes a first button used to answer the incoming voice call and a second button used to reject the incoming voice call.

In this embodiment, the target device and a calling party device that initiates a call as a calling party each may be a portable mobile terminal, for example, an electronic device that can perform a voice call, such as a mobile phone, a tablet, a netbook, a personal digital assistant (PDA), a wearable electronic device (such as a smart band or a smartwatch), or a virtual reality device.

Figure 7:
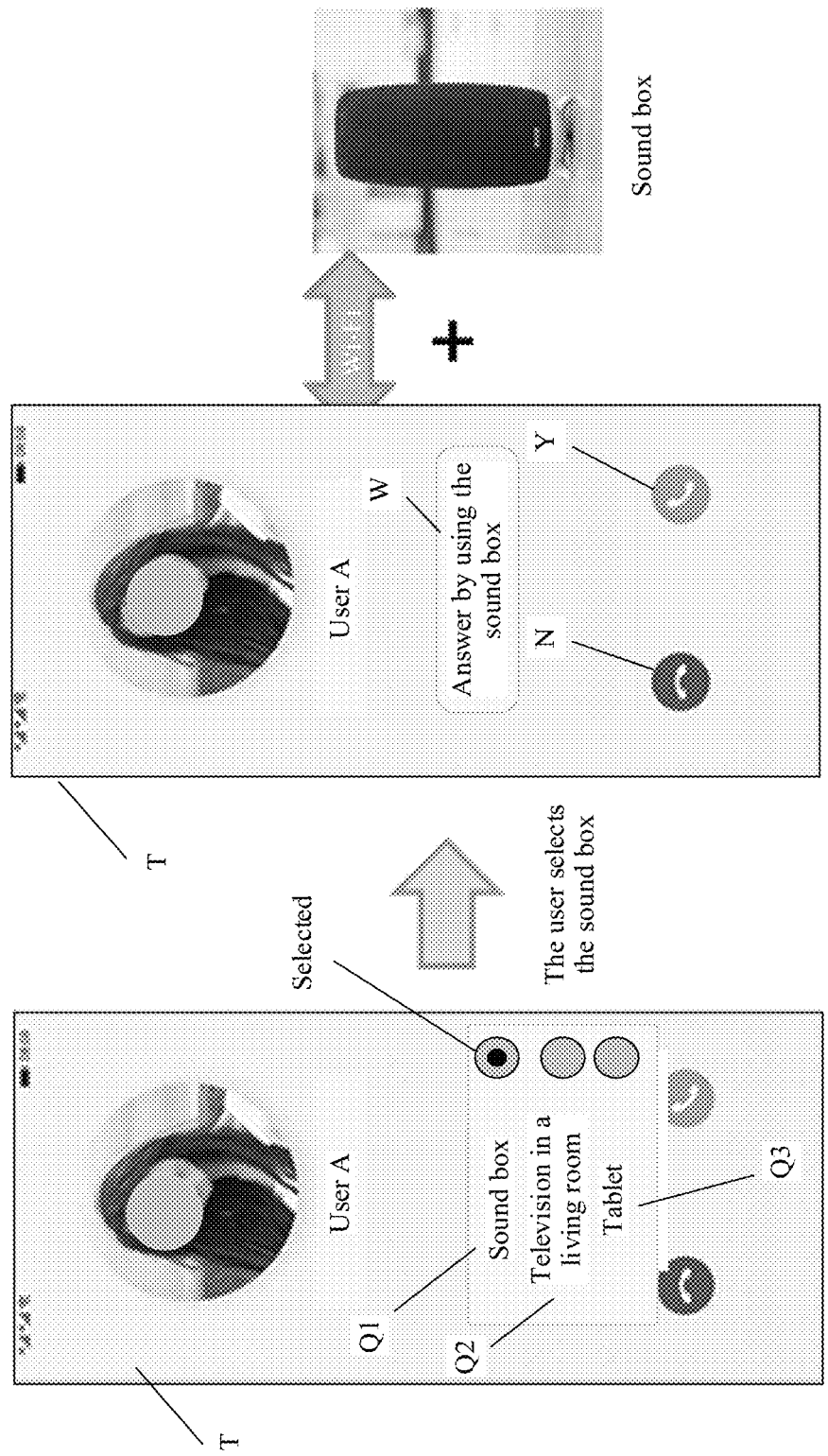
FIG. 7 is a schematic diagram of an application scenario of a voice call transfer method according to an embodiment of this disclosure.

In this embodiment, when detecting a selection operation performed on the first button, the target device may answer the incoming call and directly perform a voice call with the calling party device by using the target device (that is, perform voice playing and sound collection by using the target device), and the target device enters a regular voice call mode. When detecting a selection operation performed on the second button, the target device may reject the incoming call. There may be one or more identifiers (corresponding to one or more first devices) of first devices displayed on the call application interface. This is not limited in this disclosure. For example, as shown in FIG. 7, a first button Y, a second button N, a device identifier Q1 of a first device "Sound box", a device identifier Q2 of a first device "Television in the living room", and a device identifier Q3 of a first device "Tablet" may be displayed on the call application interface.

In this embodiment, the incoming voice call may include: The calling party device initiates a voice call to the target device based on a phone number, and the calling party device initiates a voice call to the target device by using an instant messaging application. This is not limited in this disclosure.

In a possible implementation, before step S11, the method may include: determining, based on information about the target device, a first device that meets a voice call transfer condition and a device identifier of the first device before the device identifier is displayed. The voice call transfer condition may include: a login account of the first device is the same as a login account of the target device, and the first device has functions of voice data playing and voice data collection.

In this implementation, the first device may be one or more electronic devices that can be currently touched by a user and that can perform voice call transfer, for example, a sound box, a television, a tablet, a notebook computer, or a smartwatch. For example, the target device is in a home environment, and the first device may be a device in the current home environment. In this way, screening may be performed on electronic devices that can be connected to the target device, to ensure that each first device provided for the user can perform voice call transfer.

In this implementation, the target device may determine the first device based on information related to the target device, such as login account information of the target device, a current geographical location of the target device, a device type, and a service type.

In a possible implementation, the determining, based on information about the target device, a first device that meets a voice call transfer condition and a device identifier of the first device before the device identifier is displayed may include: enabling a virtual device management module of the target device before the device identifier is displayed; sending, by using the virtual device management module, a device query request to an intelligent management system in which the target device is located, so that the intelligent management system determines, in response to the device query request, the first device that meets the voice call transfer condition; and receiving, by using the virtual device management module, information about the first device that is sent by the intelligent management system, where the information about the first device includes the device identifier of the first device.

The voice call transfer condition may further include: the first device is provided with the virtual device management module.

In the foregoing manner, a speed and efficiency of determining the first device that meets the voice call transfer condition may be improved by using the intelligent management system.

Figure 2A:
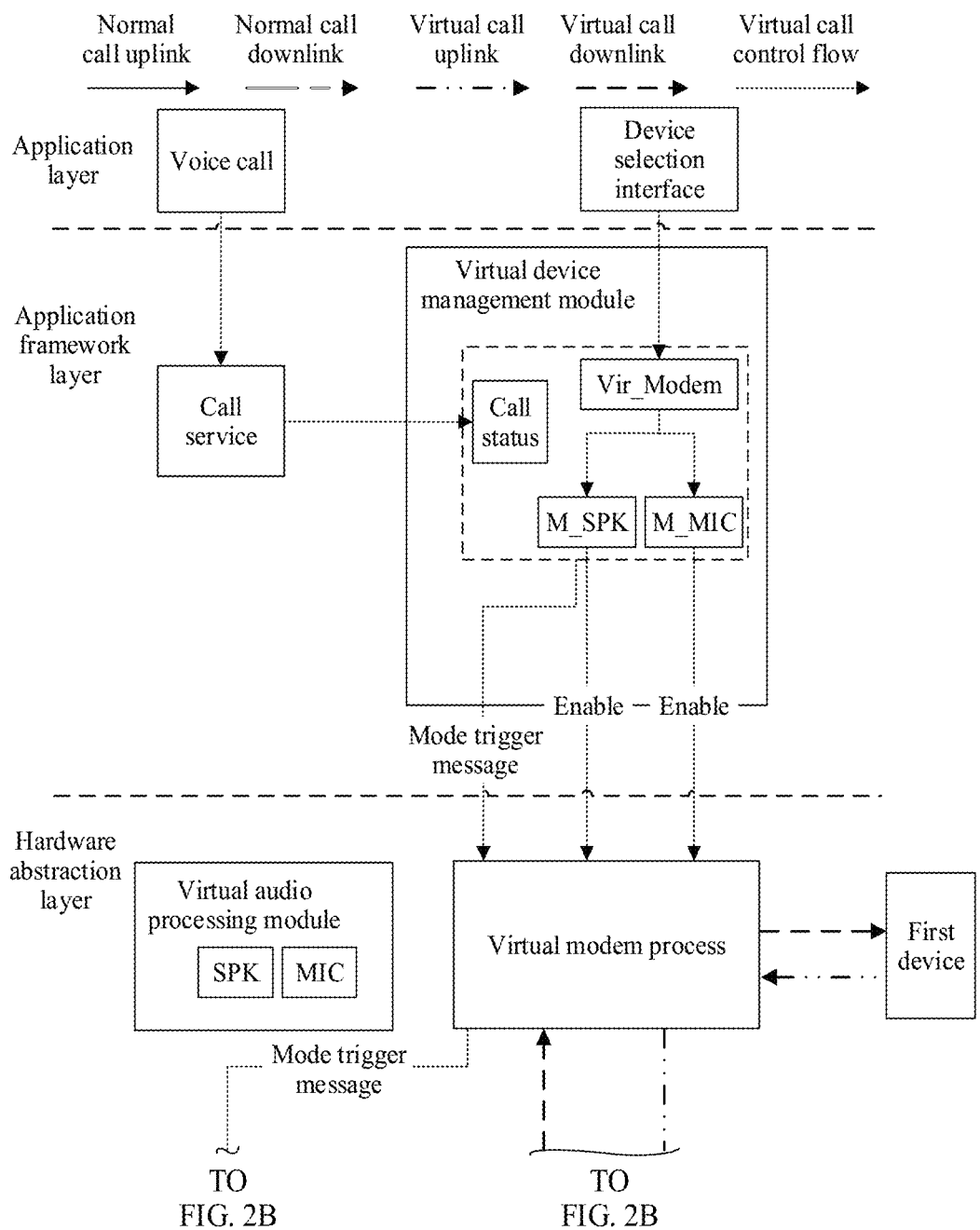
FIG. 2A and FIG. 2B are a schematic flowchart of voice call transfer according to an embodiment of this disclosure.
Figure 2B:
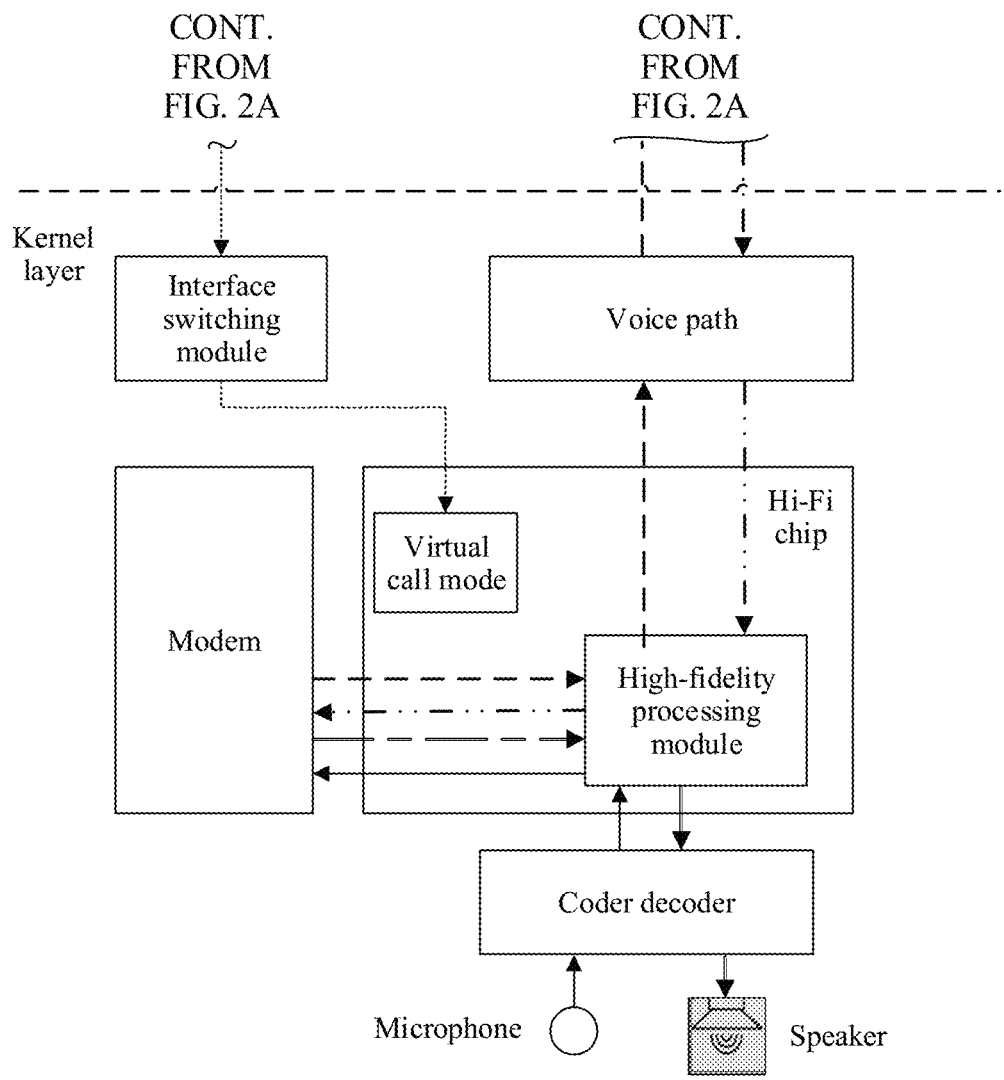

In this implementation, FIG. 2A and FIG. 2B are a schematic flowchart of voice call transfer according to an embodiment of this disclosure. As shown in FIG. 2A and FIG. 2B, the virtual device management module may be disposed at an application framework (Framework) layer of an electronic device (that is, the target device), and may also be referred to as a virtual device management application, a distributed Multicast Source Discovery Protocol (MSDP), or the like. The virtual device management module is a new function module that is set based on an MSDP and that is configured to create, use, and manage a corresponding virtual device in the electronic device according to a use requirement of the electronic device. For example, a virtual modem may be created in the electronic device by using the virtual device management module.

If the target device detects that the first button is selected, the target device implements voice data transmission based on a "normal call uplink" process and a "normal call downlink" process shown in FIG. 2A and FIG. 2B. In the "normal call uplink" process, the target device encodes, by using a coder decoder, a sound collected by a microphone, and then sends an encoded sound to a Hi-Fi processing module. After Hi-Fi processing, uplink voice data is obtained. The uplink voice data is modulated by using a modem, and then is sent to the calling party device. In the "normal call downlink" process, the target device receives downlink voice data sent by the calling party device. The downlink voice data is sequentially demodulated by the modem, processed by the Hi-Fi processing module, and decoded by the coder decoder, and then is played through voice by a speaker.

If the target device detects a selection operation performed on the device identifier of the first device, as shown in FIG. 2A and FIG. 2B, the target device performs voice data transmission by performing a "virtual call uplink" process and a "virtual call downlink" process, to implement voice call transfer. For a control procedure such as a "virtual call control flow" for implementing the voice call transfer by the target device, refer to the following specific descriptions with reference to FIG. 4A and FIG. 4B. In the "virtual call uplink" process, the target device receives second voice data sent by the first device. The second voice data is sequentially demodulated by a virtual modem process (that is, a virtual modem), processed by the Hi-Fi processing module, and modulated by the modem, and then is sent to the calling party device, so that the calling party device performs voice playing of the second voice data. In the "virtual call downlink" process, the target device receives first voice data sent by the calling party device. The first voice data is sequentially demodulated by the modem, processed by the Hi-Fi processing module, and modulated by the virtual modem process, and then is sent to the first device, so that the first device performs voice playing. Implementations of the "virtual call uplink" and the "virtual call downlink" are separately described in detail below with reference to FIG. 5A and FIG. 5B and FIG. 6A and FIG. 6B. Details are not described herein again.

In this implementation, the intelligent management system may be a smart home management system, for example, HILINK. The intelligent management system may implement management of electronic devices in a specified area. For example, in the home environment, the intelligent management system may establish a smart home platform system by using a home gateway and system software thereof, connect various electronic devices at home by using an internet of things technology, and implement functions such as automatic control and network connection control of the electronic devices and a network connection of the electronic devices according to a requirement.

Figure 3:
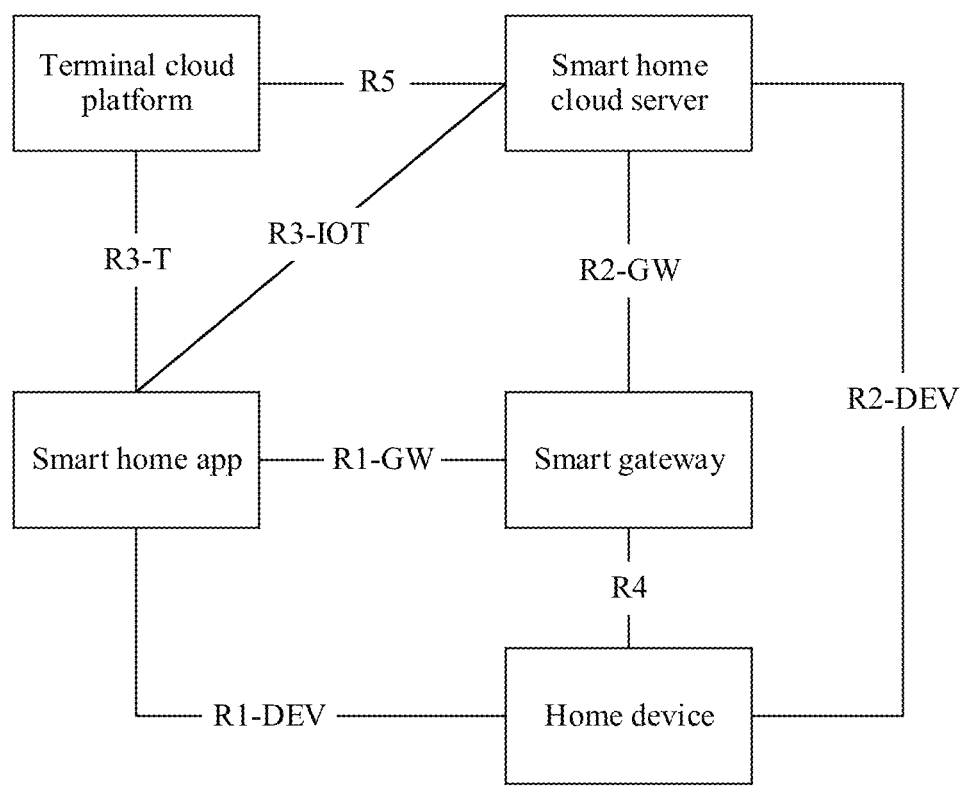
FIG. 3 is a schematic diagram of a structure of a smart home management system according to an embodiment of this disclosure.

For example, FIG. 3 is a schematic diagram of a structure of a smart home management system according to an embodiment of this disclosure. In the example of the smart home management system shown in FIG. 3, the user may install a smart home app (that is, a smart home application) in an electronic device such as a mobile phone, and control a home device (device) in the home environment through the smart home app by using interfaces (interfaces R1-GW, R1-DEV, R2-GW, R2-DEV, R3-IOT, R4, and R3-T/R5 shown in FIG. 3), a terminal cloud platform, a smart home cloud server, and a smart gateway (gateway). Table 1 shows data transmission directions and functions of the interfaces R1-GW, R1-DEV, R2-GW, R2-DEV, R3-IOT, R4, and R3-T/R5.

TABLE 1

| Interface function table | |
|---|---|
| Interface number | Interface direction and function |
| R1-GW | Interface for data transmission between the smart home app and the smart gateway for completing parameter configuration |
| R1-DEV | Interface between the smart home app and the home device for assisting in completing device registration |

TABLE 1-continued

Interface function table

| Interface number | Interface direction and function |
| --- | --- |
| R2-GW | Interface for data transmission between the smart home cloud server and the smart gateway for assisting in implementing remote management of the smart gateway and management of a connected home device |
| R2-DEV | Interface between the smart home cloud server and the home device for implementing control command delivering and event reporting |
| R3-IOT | Interface between the smart home app and the smart home cloud server for implementing data transmission of a smart home-related service |
| R4 | Interface between the smart gateway and the home device |
| R3-T/R5 | Communications interface between the smart home app, the terminal cloud platform, and the smart home cloud server |

In this implementation, the device query request may be generated based on the information about the target device and the voice call transfer condition. For example, the device query request includes the information about the target device and the voice call transfer condition. For example, the selected first device may be an electronic device to which a same HUAWEI account as the target device is logged in. Electronic devices in a same intelligent management system may log in to one account that is preset by the user, or several associated accounts (for example, accounts of different family members in a same family).

Figure 4A:
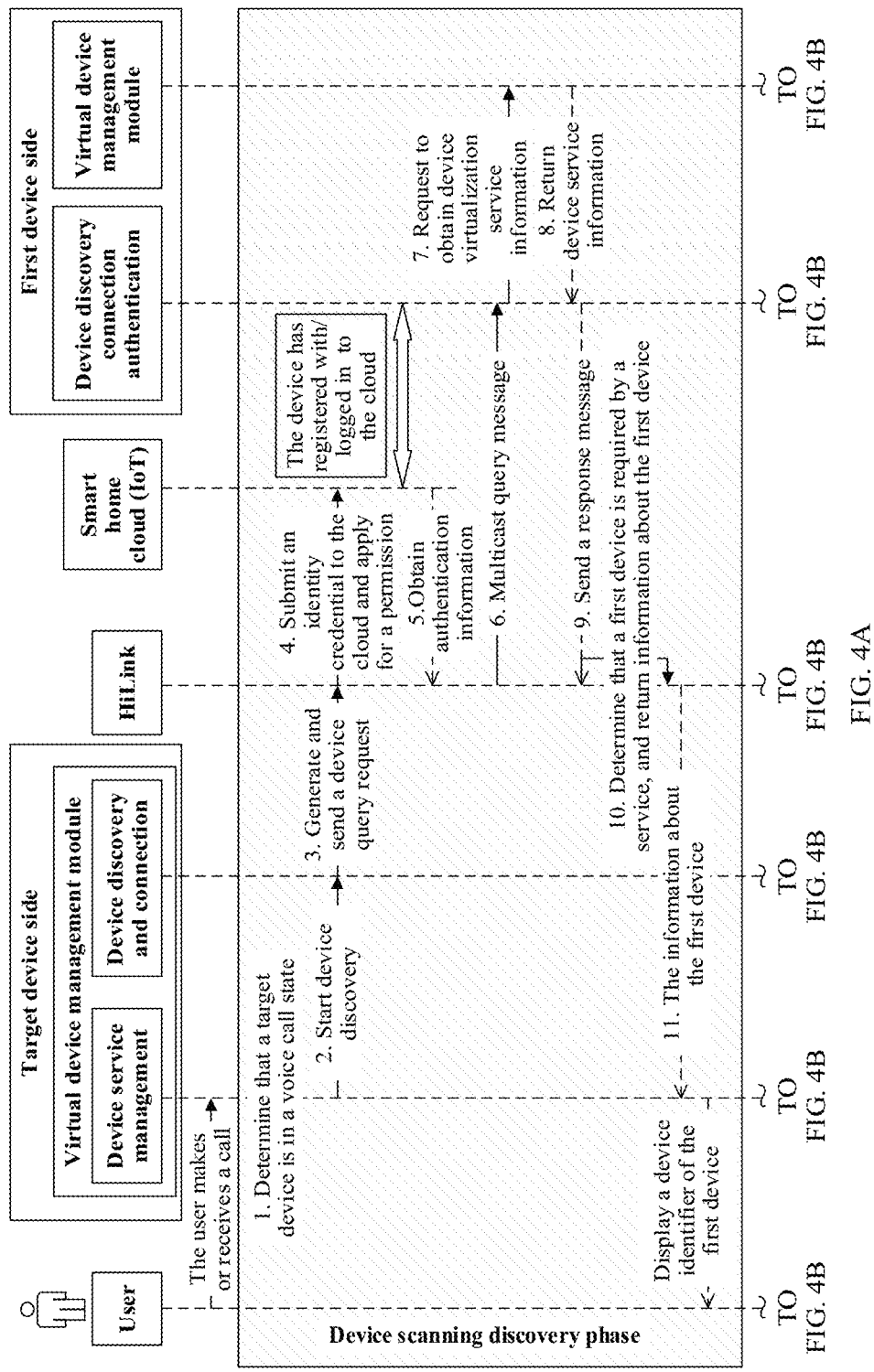
FIG. 4A and FIG. 4B are a schematic diagram of a device discovery and device connection procedure in a voice call transfer method according to an embodiment of this disclosure.
Figure 4B:
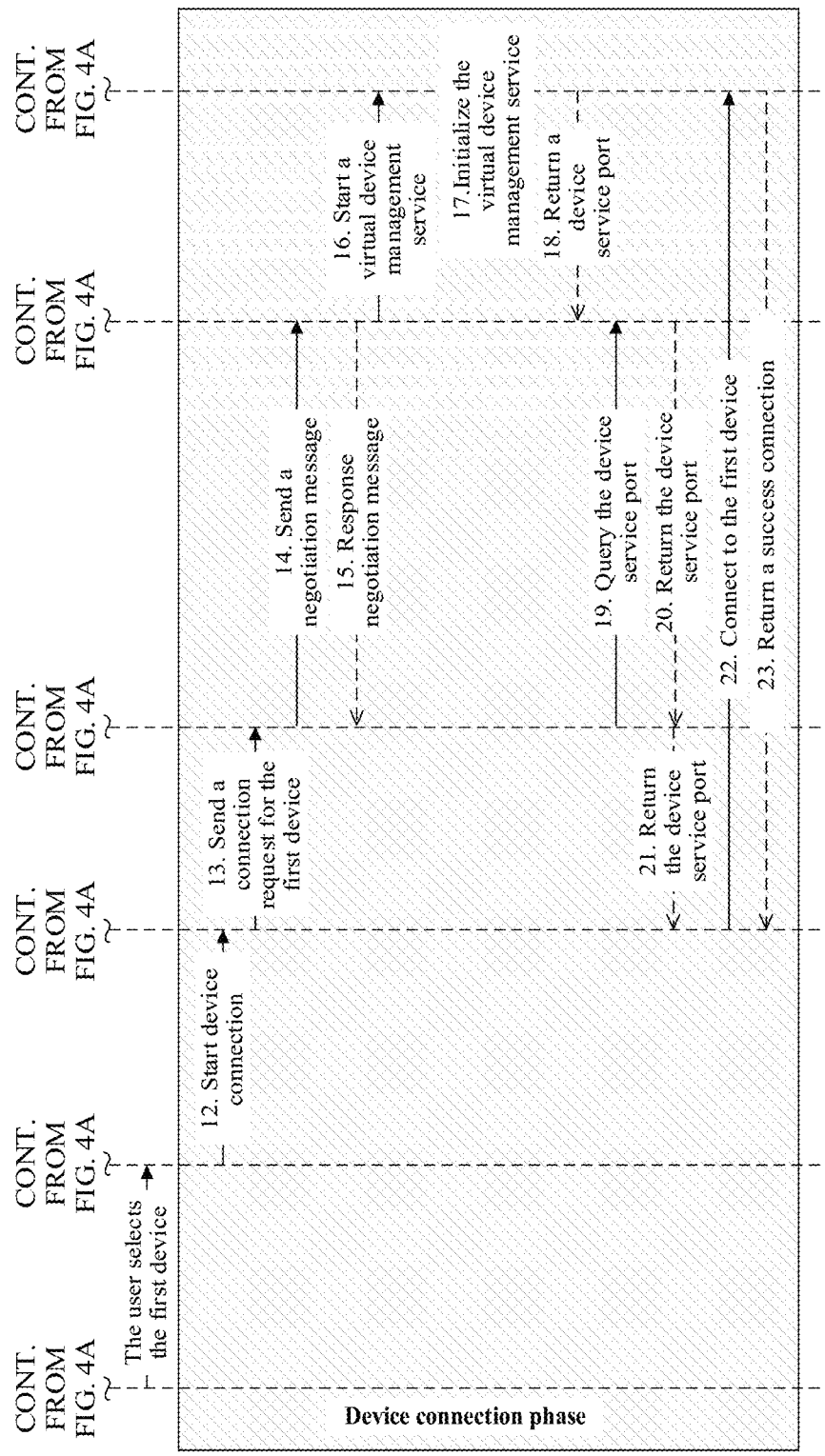

In this implementation, FIG. 4A and FIG. 4B are a schematic diagram of a device discovery and device connection procedure in a voice call transfer method according to an embodiment of this disclosure. As shown in FIG. 4A and FIG. 4B, the virtual device management module of the target device may include two modules: a device service management module and a device discovery and connection module. The device service management module is configured to monitor a call status. When determining that the target device initiates a voice call (for example, is in a voice call state) (step 1), the device service management module starts a device discovery process (step 2), and generates and sends a device query request (step 3). After receiving the device query request, the intelligent management system (for example, HILINK) may first perform identity authentication on the target device based on account information in the device query request, to obtain authentication information (step 4 and step 5). For example, the identity authentication is performed on the target device through a network connection by using a smart home cloud (internet of things (IoT)) corresponding to the intelligent management system, to obtain the authentication information. After receiving the authentication information, the intelligent management system sends, based on a device condition in the device query request, a query message to all devices managed by the intelligent management system, for example, sends the query message in a multicast manner (step 6). After receiving the query message, the device obtains virtualization service information of the device, generates a response message based on the obtained virtualization service information, and sends the response message (step 7, step 8, and step 9). The intelligent management system determines a first device based on a response message returned by each device after the device receives the query message (step 10), and sends information about the first device to the virtual device management module of the target device (step 11). The information about the first device may include information related to the first device, such as a type, a name, an Internet Protocol (IP) address, service information, and a device identifier of the first device. This is not limited in this disclosure.

In this embodiment, the first device may be determined through querying by the intelligent management system by using the foregoing method. Alternatively, the first device may be determined through querying by the target device. For example, a device that has previously established a connection to the target device is determined as the first device. Alternatively, device querying is performed in real time by using the target device, and a found device is determined as the first device. A person skilled in the art may set, according to an actual requirement, a manner of determining the first device. This is not limited in this disclosure.

In step S12, the target device receives the selection operation performed on the device identifier, and triggers the target device to enter a voice call transfer mode.

In this embodiment, after the target device enters the voice call transfer mode, in a process in which the target device performs a voice call with the calling party device, voice data is transmitted by performing the "virtual call uplink" process and the "virtual call downlink" process. The target device may display, to the user on the call application interface of the target device based on the information about the first device, information such as the device identifier of the first device that can be selected, for example, may display the device identifier to the user in a form of a text or a schematic diagram for selection. The first device selected by the user may be determined based on the detected selection operation sent by the user. For example, as shown in FIG. 7, when an operation such as a tap or a slide performed on the device identifier Q1 of "Sound box" displayed on the call application interface is detected, "Sound box" is determined as the first device selected by the user. A person skilled in the art may set, according to an actual requirement, a manner of determining the first device based on the selection operation. This is not limited in this disclosure.

In this embodiment, when there is a plurality of device identifiers on the call application interface, a device identifier selected by the user is determined based on a selection operation, so as to determine a first device selected by the user. When there is one device identifier on the call application interface, if a selection operation performed on the unique device identifier is detected, it is determined that the user selects a first device corresponding to the device identifier.

In this embodiment, after the voice call transfer mode of the target device is triggered, the target device may generate a mode trigger message, and send the mode trigger message to a part that is in the target device and that is related to implementation of a voice call transfer process, such as the virtual modem or the Hi-Fi processing module, so that each part of the target device can enter the voice call transfer mode to implement voice call transfer.

In a possible implementation, as shown in FIG. 7, after entering the voice call transfer mode, the target device may further display transfer device information W on the call application interface to the user, so that the user can determine, based on the transfer device information W, the first device to which the voice call is transferred.

In a possible implementation, step S12 may include: enabling a demodulation function and a modulation function of the virtual modem of the target device for audio data by using the virtual device management module of the target device, to enable the virtual modem; and when it is determined that the virtual modem is enabled and the target device is in a voice call state, determining to trigger the target device to enter the voice call transfer mode.

In the foregoing manner, the virtual modem is enabled to trigger the voice call transfer mode, to ensure stable and reliable running of voice call transfer between the target device and the first device.

In this implementation, the virtual device management module may be disposed at the application framework (Framework) layer of the target device. The virtual device management module may enable, at the application framework layer, the demodulation function ("M_SPK" shown in FIG. 2A and FIG. 2B) and the modulation function ("M_MIC" shown in FIG. 2A and FIG. 2B) of the virtual modem for the audio data, so that the virtual modem at a hardware abstraction layer (HAL layer) can have the demodulation function and the modulation function for the audio data, so as to enable the virtual modem. After the virtual modem is enabled, a new virtual modem process may be added at the HAL layer to process received voice data. Alternatively, as shown in FIG. 2A and FIG. 2B, the target device may predispose a virtual audio processing module, and establish the virtual modem process when it is determined that the demodulation function and the modulation function for the audio data are enabled, so as to enable the virtual modem.

In this implementation, the virtual device management module may pre-register the demodulation function and the modulation function of the virtual modem for the audio data, or may register the demodulation function and the modulation function of the virtual modem for the audio data in real time before the virtual modem is enabled.

In this implementation, only when determining that both the modulation function and the demodulation function of the virtual modem are in an enabled state, the virtual device management module may determine that the virtual modem is enabled. When only one of the modulation function and the demodulation function of the virtual modem is enabled, or both the modulation function and the demodulation function of the virtual modem are in a disabled state, the virtual device management module needs to control enabling of the modulation function and/or the demodulation function again; or the virtual device management module may send a determined failure cause of enabling the virtual modem to the user, and perform further processing based on a response of the user.

In this implementation, the call status of the target device may include an idle (IDLE) state, a ring (RING) state, and the voice call (IN CALL) state. Triggering the target device to enter the voice call transfer mode is determined when it is determined that the virtual modem is enabled and the target device is in the voice call state. If it is detected that the virtual modem is not enabled and the target device is in the voice call state, the target device is controlled to enter the regular voice call mode. After the voice call transfer mode is triggered, if it is detected that the virtual modem is not enabled and the target device is in the voice call state, the voice call transfer mode is disabled and the regular voice call mode is entered. Alternatively, after the voice call transfer mode is triggered, the voice call mode of the target device is switched from the voice call transfer mode to the regular voice call mode based on a detected mode switching operation. In the regular voice call mode, an audio player component such as an earpiece or the speaker of the target device is used to perform voice playing, and an audio collection component such as the microphone is used to collect voice data.

In a possible implementation, a mode switching button may be further displayed on the call application interface, to implement switching between the voice call transfer mode and the regular voice call mode. If a current call mode is the "regular voice call mode", the device identifier of the first device may be further displayed on the call application interface.

In a process in which the target device performs a voice call with the calling party device in the "voice call transfer mode", if it is detected that the mode switching button is triggered, the target device is controlled to switch from the "voice call transfer mode" to the "regular voice call mode", and to switch to a mode in which the voice call is directly performed between the target device and the calling party device.

In a process in which the target device performs a voice call with the calling party device in the "regular voice call mode", if it is detected that the mode switching button is triggered, the target device is controlled to switch from the "regular voice call mode" to the "voice call transfer mode"; and determine, based on a detected selection operation performed on the device identifier, a first device selected by the user, and transfer the voice call to the first device.

In the foregoing manner, free switching between the "voice call transfer mode" and the "regular voice call mode" may be implemented, so as to meet diversified requirements of the user in different scenarios.

In a possible implementation, in the voice call transfer process, if it is detected that the first device no longer responds to the target device, the target device may automatically switch the "voice call transfer mode" to the "regular voice call mode", and the voice call is directly performed between the target device and the calling party device.

In step S13, the target device sends the first voice data from the calling party device to the first device when determining that the target device performs the voice call with the calling party device and is in the voice call transfer mode, so that the first device plays the first voice data.

In a possible implementation, step S13 may include: sending processed first voice data to the first device after demodulation and Hi-Fi processing are performed on the received first voice data. In this way, quality of voice played by the first device is ensured, and a high-quality auditory requirement of the user is met.

In a possible implementation, the sending processed first voice data to the first device after demodulation and Hi-Fi processing are performed on the received first voice data may include: demodulating the first voice data by using a modem of the target device, to obtain demodulated first voice data; processing the demodulated first voice data by using the Hi-Fi processing module of the target device, to obtain processed first voice data; and sending modulated first voice data to the first device after the processed first voice data is modulated by using the virtual modem of the target device.

The foregoing manner can ensure data transmission efficiency and a data transmission speed, ensure quality of voice played by the first device, and meet a high-quality auditory requirement of the user.

In this implementation, the modem of the target device may be configured to: receive the first voice data from the calling party device and demodulate the first voice data, and send the demodulated first voice data to the Hi-Fi processing module. Alternatively, the modem may place the demodulated first voice data in a voice stream, so that the target device may write voice data in the voice stream into the Hi-Fi processing module at a preset time interval (for example, 20 milliseconds (ms)).

In a possible implementation, as shown in FIG. 2A and FIG. 2B, the modem and the Hi-Fi processing module may be disposed at a kernel layer of the target device. A voice path used for voice data transmission may be established between the virtual modem and the Hi-Fi processing module, that is, the voice path used for voice data transmission is established between the virtual modem process and the Hi-Fi processing module. The Hi-Fi processing module is further configured to connect to the audio data player component such as the speaker or a horn of the target device and the audio data collection component such as the microphone of the target device through a corresponding path. The coder decoder may be further disposed between the Hi-Fi processing module, the audio data player component, and the audio data collection component, so as to implement encoding and decoding of the audio data.

In a possible implementation, as shown in FIG. 2A and FIG. 2B, the Hi-Fi processing module may be disposed in a Hi-Fi processing module, a Hi-Fi chip, or the like in the target device. The Hi-Fi processing module may collect voice data through narrowband (8k), broadband (16k), ultra-broadband (32k), or the like, and the Hi-Fi processing module may process the audio data based on the foregoing data collection bandwidth. In addition, to meet a voice call transfer requirement, the Hi-Fi processing module may perform resampling on received voice data. For example, the Hi-Fi processing module may perform resampling on the received voice data through two sound channels at a sampling rate of 48k. A person skilled in the art may set a sampling rate and a quantity of sound channels for resampling according to an actual requirement. This is not limited in this disclosure. The Hi-Fi processing module processes voice data to improve voice quality.

In a possible implementation, as shown in FIG. 2A and FIG. 2B, an interface switching module may be further disposed at the kernel layer. When receiving the mode trigger message forwarded by the virtual modem process, the interface switching module may control to enable a voice path between the Hi-Fi processing module and the virtual modem process, so that the Hi-Fi processing module can send processed voice data to the virtual modem process instead of the audio data player component and the audio data collection component of the target device. When not receiving the mode trigger message forwarded by the virtual modem process, the interface switching module may control the Hi-Fi processing module to enable a path between the Hi-Fi processing module and the audio data player component and the audio data collection component of the target device, so that the Hi-Fi processing module can send processed voice data to the audio data player component and the audio data collection component of the target device instead of the virtual modem process.

In a possible implementation, as shown in FIG. 2A and FIG. 2B, a mode detection module may be further disposed at the kernel layer. When detecting that the voice call transfer mode is triggered, the mode detection module controls the Hi-Fi processing module to send the processed first voice data to the virtual modem process through the voice path, so that the virtual modem process can modulate the processed first voice data and send modulated first voice data to the first device. When detecting that the voice call transfer mode is not triggered, the mode detection module controls the Hi-Fi processing module to send the processed first voice data to the audio data player component such as the speaker or the horn of the target device through the voice path, so as to implement voice playing of the processed first voice data. The mode detection module may be disposed in the Hi-Fi processing module or the Hi-Fi chip. The interface switching module and the mode detection module may be combined to form a voice path proxy module, that is, a voice path proxy module described in FIG. 5A and FIG. 5B and related text descriptions.

In a possible implementation, before step S13, the method may further include: controlling the target device to establish WI-FI direct (which may also be referred to as WI-FI P2P, and may exist in a WI-FI protocol cluster and enable devices to be connected to each other without using a wireless router) with the first device after the voice call transfer mode is triggered. Step S13 may include: sending the first voice data to the first device through the WI-FI direct. In this way, voice data may be transmitted between the target device and the first device through the WI-FI direct, to improve transmission efficiency and a transmission speed.

In a possible implementation, the controlling the target device to establish WI-FI direct with the first device after the voice call transfer mode is triggered may include: enabling the virtual modem in the target device by using the virtual device management module of the target device, and controlling the virtual modem to establish WI-FI direct with the first device.

In this implementation, a manner of controlling the virtual modem to establish WI-FI direct with the first device may include: sending, by using the virtual device management module, a connection request for the first device to the intelligent management system in which the target device is located, so that the intelligent management system invokes a connection interface based on the connection request to establish the WI-FI direct.

The foregoing manner can simplify a step of establishing the WI-FI direct between the target device and the first device, and improve a speed and efficiency of establishing the WI-FI direct.

As shown in FIG. 4A and FIG. 4B, after determining the first device selected by the user, the virtual device management module starts a device connection process (step 12), and sends the connection request to HILINK (step 13). HILINK sends a negotiation message to the first device in response to the connection request (step 14). A device discovery connection authentication module of the first device returns a response negotiation message (step 15), and sends an instruction for starting a virtual device management service to the virtual device management module of the first device (step 16), so that the virtual device management module of the first device initializes the virtual device management service of the first device (that is, the first device can implement voice call transfer with the target device), and determines a device service port (step 17 and step 18). When receiving a device service port query request from HILINK (step 19), the device discovery connection authentication module of the first device returns device service port information (step 20). HILINK returns the received device service port information to the target device (step 21), so that the target device establishes the WI-FI direct with the first device based on the device service port information (step 22 and step 23).

In this embodiment, the virtual device management module or the intelligent management system may perform a corresponding operation based on a received interface parameter of an interface. Table 2 shows interface examples and interface parameter meanings. For example, the intelligent management system may determine, based on a parameter of a "device discovery interface", whether a device corresponding to the interface can be determined as the first device. The intelligent management system can stop device discovering based on a "stop device discovery interface". When stopping the device discovering, the intelligent management system invokes a listened instance as a parameter. A communication connection and data transmission between the target device and the calling party device may be implemented based on a "device connection interface". Based on a "disconnect device interface", the target device may be disconnected from a device corresponding to the "disconnect device interface".

TABLE 2

Interface example

| Interface | Interface form | Parameter list | Parameter meaning and function |
|---|---|---|---|
| Device discovery interface | int startDiscovery (const char* at, int deviceFilter, int serviceFilter, DiscoverListener listener) | at | Login account information of the target device, used for disallowing null or invalid information transmission |
| | | deviceFilter | Device type filtering, used for performing discovering on a device type (a device such as a sound box, a TV, or a tablet), and reporting a device of the type instead of reporting another device (a device having no calling capability such as a router or a camera) |
| | | serviceFilter | Service type (supporting a MIC/Speaker service) filtering, used for performing discovering on a service type, and reporting only a device of the service type |
| | | listener | Callback interface discovering onDeviceFound: device discovery callback event, where the callback event carries information about a discovered device onDeviceLost: Device lost callback event, where the callback event carries information about a lost device onDeviceUpdate: Device update event, where the callback event indicates an updated device and a type of the updated device |
| Stop device discovery interface | int stopDiscover (DiscoverListener listener) | listener | Listening instance, generally used for storing a listener instance when discovery starts, and using the instance as a parameter for invoking when the discovery stops |
| Device connection interface | int sendCommand (deviceid device) | device | Parameter of the calling party device, including: deviceid: information about the calling party device deviceType: type of the calling party device localIP: local IP address of the calling party device remoteIP: IP address of the target device (generally a local IP address of the target device) port: Socket port of the calling party device (output) sessionKey: transmission encryption key information (output) |
| Disconnect device interface | int disconnectDevice (deviceid device) | device | Information about a disconnected device |

It should be noted that the foregoing implementation of implementing WI-FI direct between the virtual modem and the first device based on an existing connection of the intelligent management system is only an example of implementing WI-FI direct between the virtual modem and the first device, and is not limited thereto. A person skilled in the art may set a manner of implementing "WI-FI direct between the virtual modem and the first device" according to an actual requirement. This is not limited in this disclosure.

Figure 5A:
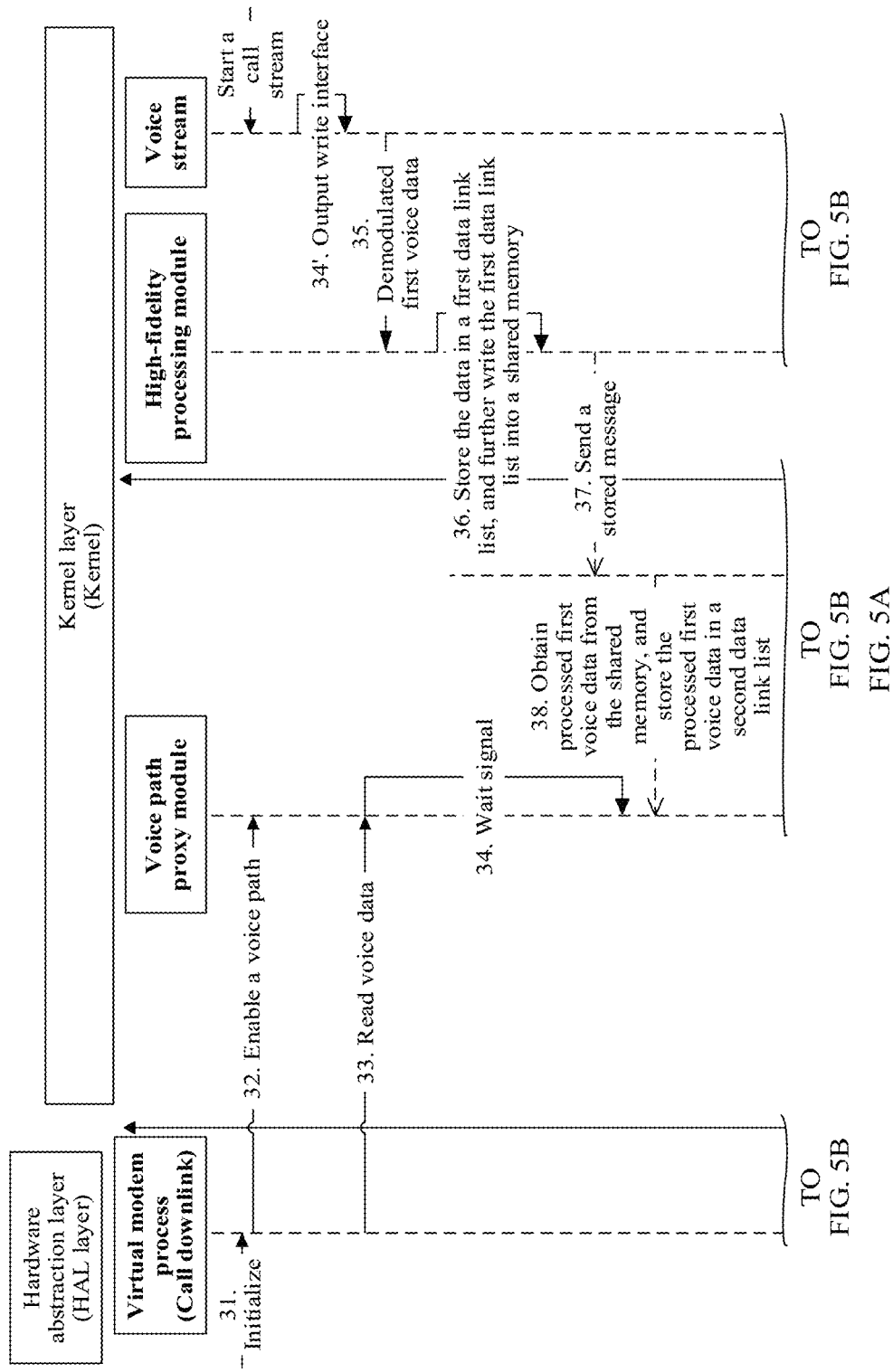
FIG. 5A and FIG. 5B are a schematic diagram of a virtual call downlink procedure in a voice call transfer method according to an embodiment of this disclosure.
Figure 5B:
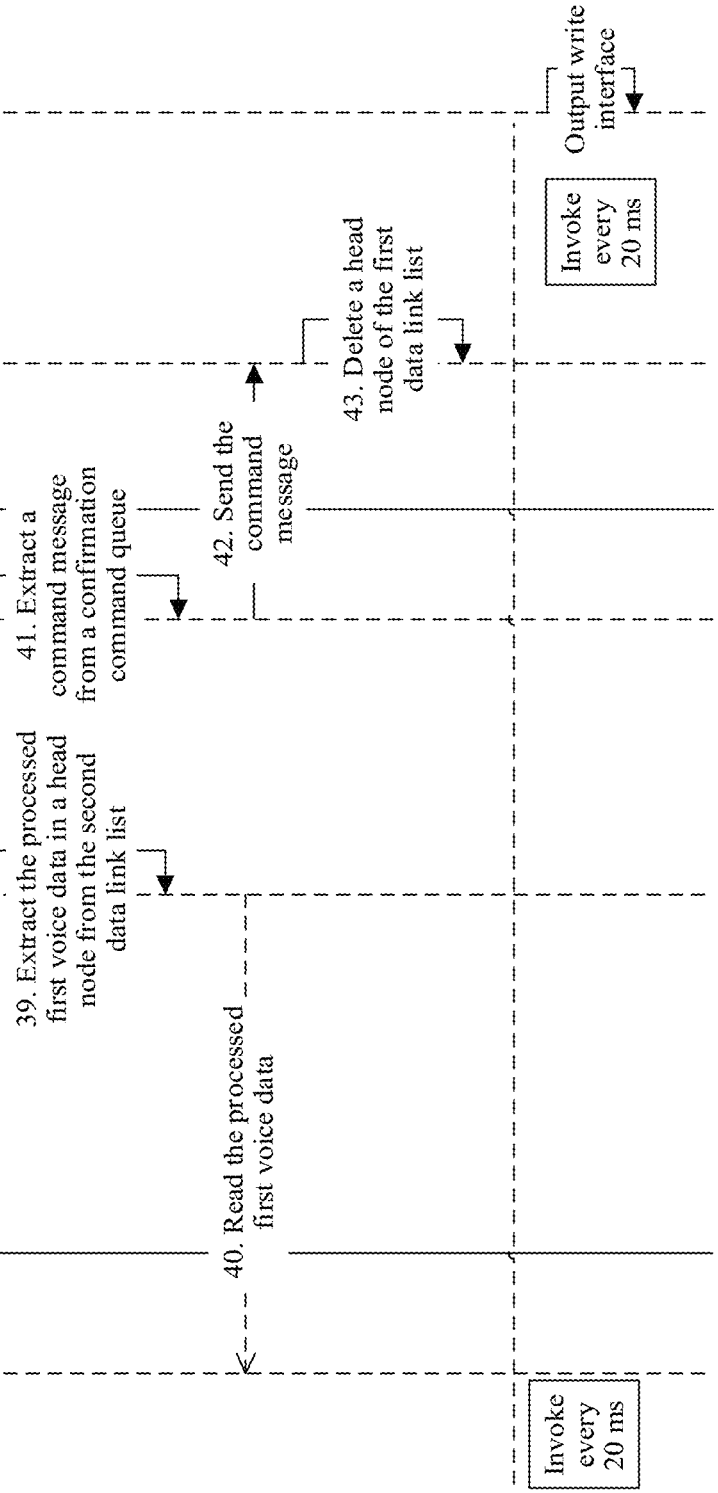

FIG. 5A and FIG. 5B are a schematic diagram of a virtual call downlink procedure in a voice call transfer method according to an embodiment of this disclosure. As shown in FIG. 5A and FIG. 5B, the virtual call downlink means that first voice data sent by a calling party device is sent to a first device. An implementation process thereof may include:

When a virtual modem process determines that a voice call transfer mode is triggered, the virtual modem process is initialized (step 31). A voice path between the virtual modem process and a Hi-Fi processing module is enabled (step 32). The virtual modem process reads voice data from a voice path proxy module at a preset time interval (for example, 20 ms) (step 33), that is, reads processed first voice data. After determining that a voice path is enabled, the voice path proxy module sets a wait signal (step 34).

When determining that the voice call transfer mode is triggered, the Hi-Fi processing module may dispose an "output write interface" interface (step 34), so that a target device may send demodulated first voice data in a voice stream to the "output write interface" at a specified time interval (for example, 20 ms). In this way, the Hi-Fi processing module may obtain the demodulated first voice data from the "output write interface" (step 35), and process the demodulated first voice data to obtain the processed first voice data, store the processed first voice data in a head node of a first data link list, further write the first data link list into a shared memory (step 36), and send a stored message after successful writing (step 37).

The target device obtains the processed first voice data from the shared memory based on the stored message, and stores the processed first voice data in a head node of a second data link list (step 38). Then, the target device extracts, from a preset confirmation command queue, a command message corresponding to current data storage (step 41), sends the command message to the Hi-Fi processing module (step 42). In this way, the Hi-Fi processing module deletes data in the head node of the first data link list (step 43), so that the Hi-Fi processing module can continue to store a next piece of processed first voice data.

The voice path proxy module continuously extracts, from the second data link list based on the wait signal (for example, the wait signal is woken up by a wakeup signal), the processed first voice data stored in the head node (step 39), so that the virtual modem process may read the processed first voice data (step 40).

In a possible implementation, the method may further include: forwarding second voice data to the calling party device when the second voice data is received from the first device, so that the calling party device plays the second voice data. The second voice data is obtained by the first device by collecting data of voice in an environment in which the first device is located. In a virtual call uplink process, the first device collects the data of the voice in the environment in which the first device is located, to obtain the second voice data, and sends the second voice data to the target device, so that the target device forwards the second voice data to the calling party device, and then the calling party device performs voice playing based on the received data.

In the foregoing manner, the second voice data collected by the first device may be forwarded to the calling party device, to implement uplink data transmission during voice call transfer.

In a possible implementation, the forwarding second voice data to the calling party device when the second voice data is received from the first device may include: sending processed second voice data to the calling party device after demodulation and Hi-Fi processing are performed on the second voice data. In this way, quality of voice data played by the calling party device may be ensured, and a high-quality auditory requirement of a user may be met.

In a possible implementation, the sending processed second voice data to the calling party device after demodulation and Hi-Fi processing are performed on the second voice data may include: demodulating the second voice data by using a virtual modem of the target device, to obtain demodulated second voice data; processing the demodulated second voice data by using the Hi-Fi processing module of the target device, to obtain to-be-modulated second voice data; and modulating the to-be-modulated second voice data by using a modem of the target device, to obtain processed second voice data, and sending the processed second voice data to the calling party device.

The foregoing manner can ensure data transmission efficiency and a data transmission speed, ensure the quality of voice played by the calling party device, and meet the high-quality auditory requirement of the user.

In this implementation, the Hi-Fi processing module may directly send the to-be-modulated second voice data to the modem, so that the modem modulates the to-be-modulated second voice data. Alternatively, the Hi-Fi processing module may place the to-be-modulated second voice data in the voice stream, so that the modem may obtain the to-be-modulated second voice data from the voice stream at the preset time interval (for example, 20 ms).

FIG. 6A and FIG. 6B are a schematic diagram of a virtual call uplink procedure in a voice call transfer method according to an embodiment of this disclosure. As shown in FIG. 6A and FIG. 6B, the virtual call uplink means that second voice data sent by a first device is processed and then sent to a calling party device. An implementation process may include:

When a virtual modem process determines that a voice call transfer mode is triggered, the virtual modem process is initialized. A voice path between the virtual modem process and a Hi-Fi processing module is enabled (step 51). The virtual modem process writes demodulated second audio data obtained through demodulation into a voice path proxy module at a preset time interval (for example, 20 ms) (step 52). The voice path proxy module stores the received demodulated second voice data in a third data link list (step 53), and sends a wakeup signal (step 54). A target device wakes up a wait signal of a write daemon thread based on the wakeup signal, to read the demodulated second voice data from the third data link list, writes the demodulated second voice data into a shared memory (step 55), and sends a stored message to the Hi-Fi processing module after completing the writing (step 56).

After receiving the stored message, the Hi-Fi processing module reads the demodulated second voice data from the shared memory, processes the demodulated second voice data to obtain to-be-modulated second voice data, and stores the to-be-modulated second voice data in a fourth data link list (step 57). After receiving a data obtaining request from a voice stream (step 58), the Hi-Fi processing module reads the to-be-modulated second voice data in the fourth data link list and sends the to-be-modulated second voice data to the voice stream (step 59 and step 60). The modem may obtain the to-be-modulated second voice data from the voice stream at a specified time interval (for example, 20 ms) by using a "reading" interface, and send processed second voice data obtained through modulation to the calling party device.

With reference to an example application scenario of "a user transferring a voice call in a mobile phone to a sound box", the following provides an application example according to this embodiment of this disclosure, to facilitate understanding of a process of the voice call transferring method. A person skilled in the art should understand that the following application example is only intended to facilitate understanding of embodiments of this disclosure, and should not be considered as a limitation on embodiments of this disclosure.

FIG. 7 is a schematic diagram of an application scenario of a voice call transfer method according to an embodiment of this disclosure. As shown in FIG. 7, a user uses a mobile phone (that is, a target device) to perform a voice call with a user A that uses a calling party device. When detecting that an incoming voice call is received as a called party, the mobile phone determines information about one or more first devices that can voice call transfer. It is assumed that the determined first devices are a sound box, a television in a living room, and a tablet. Then, the first button Y, the second button N, the device identifier Q1 of the first device "Sound box", the device identifier Q2 of the first device "Television in the living room", and the device identifier Q3 of the first device "Tablet" are displayed to the user on the call application interface T on the screen of the mobile phone. When detecting a selection operation performed by the user on the device identifier Q1 of "Sound box", a virtual device management module transfers the voice call to "Sound box" after determining that "Sound box" is selected, and displays the transfer device information W on the call application interface T of the screen of the mobile phone, to indicate a device to which the current voice call is transferred. Then, in a process in which the mobile phone performs the voice call with the calling party device, voice data is transmitted based on the foregoing "virtual call downlink" and "virtual call uplink" processes, to implement voice call transfer.

Figure 8:
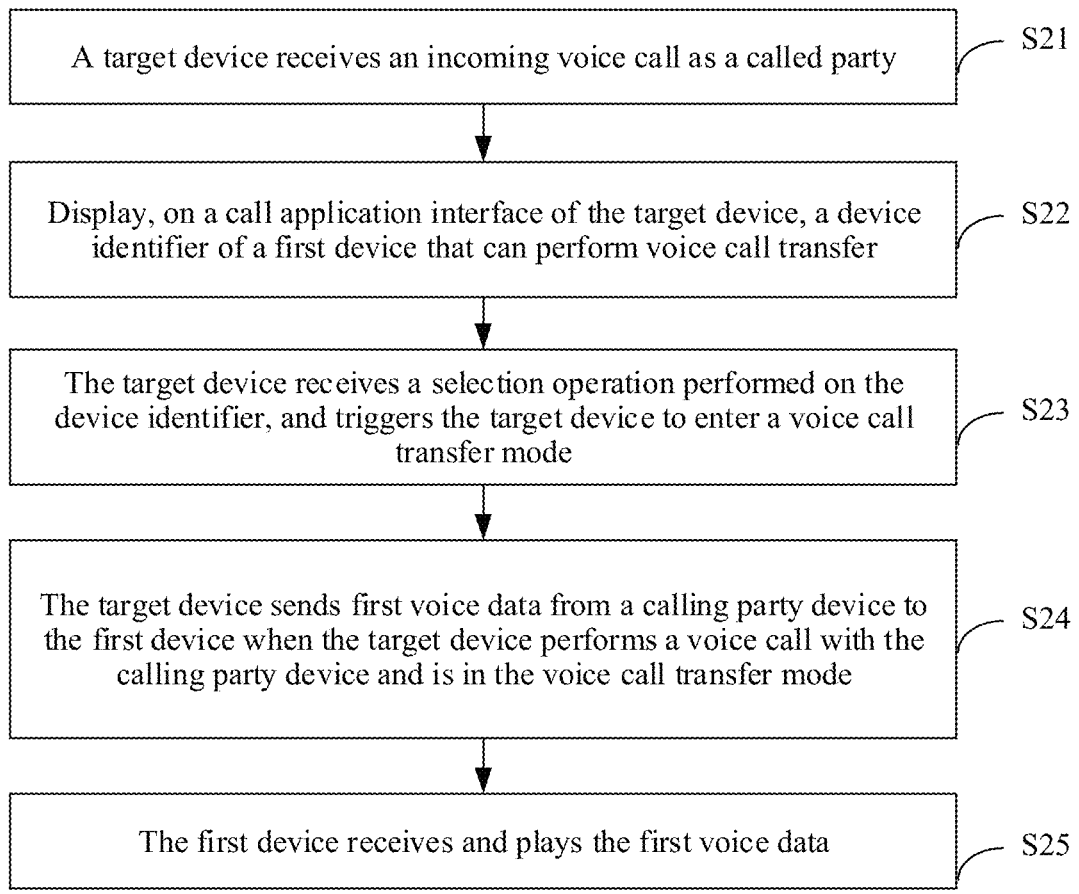
FIG. 8 is a flowchart of a method for performing voice call transfer between a target device and a first device according to an embodiment of this disclosure.

FIG. 8 is a flowchart of a method for performing voice call transfer between a target device and a first device according to an embodiment of this disclosure. As shown in FIG. 8, the method includes step S21 to step S25.

In step S21, the target device receives an incoming voice call as a called party.

In step S22, the target device displays, on a call application interface of the target device, a device identifier of the first device that can perform voice call transfer, where the call application interface further includes a first button used to answer the incoming voice call and a second button used to reject the incoming voice call. For step S21 and step S22, refer to related descriptions of step S11. Details are not described herein again.

In step S23, the target device receives a selection operation performed on the device identifier, and triggers the target device to enter a voice call transfer mode. For step S23, refer to related descriptions of step S12. Details are not described herein again.

In step S24, the target device sends first voice data from a calling party device to the first device when the target device performs a voice call with the calling party device and is in the voice call transfer mode. For step S24, refer to related descriptions of step S13. Details are not described herein again.

In step S25, the first device receives and plays the first voice data.

In this embodiment, after receiving the first voice data, the first device performs processing such as demodulation on the first voice data, and then plays the first voice data by a speaker in the first device, so that the user hears, by using the first device, the first voice data sent by the calling party device.

Figure 9:
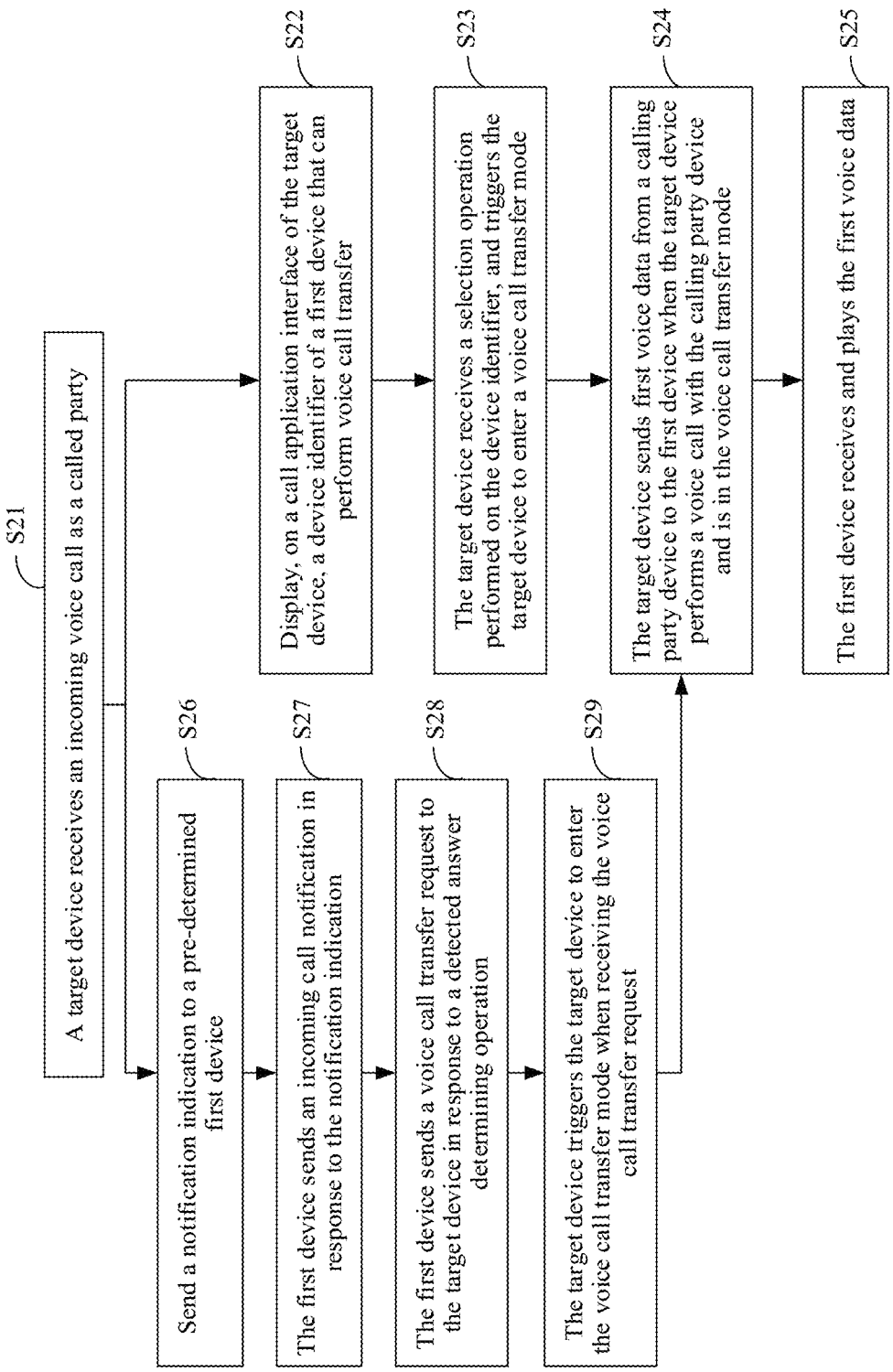
FIG. 9 is a flowchart of a method for performing voice call transfer between a target device and a first device according to an embodiment of this disclosure.

FIG. 9 is a flowchart of a method for performing voice call transfer between a target device and a first device according to an embodiment of this disclosure. In a possible implementation, as shown in FIG. 9, the method may further include step S26 to step S29.

In step S26, the target device sends a notification indication to a pre-determined first device after detecting that the target device receives the incoming voice call as the called party.

In step S27, the first device sends an incoming call notification in response to the notification indication.

In step S28, the first device sends a voice call transfer request to the target device in response to a detected answer determining operation.

In step S29, the target device triggers the target device to enter the voice call transfer mode when receiving the voice call transfer request.

In the foregoing manner, the user may respond to the incoming voice call by using the first device, to facilitate a voice call of the user.

A difference between the example shown in FIG. 9 and the example shown in FIG. 8 lies in that FIG. 9 provides a new manner of triggering the target device to enter the voice call transfer mode. The first device sends the incoming call notification, so that a notification range of notifying the user of the incoming voice call can be expanded, to prevent the user from missing the incoming voice call. The incoming call notification may be a notification sent by the first device in a form of a sound, light, or the like. For example, the first device sends a voice notification "You have a voice call. Do you want to answer the call by using the first device?".

In this implementation, when there is a plurality of first devices, the target device may perform screening on the plurality of current first devices, select one first device, and send the notification indication to the first device. Alternatively, when there is a plurality of first devices, the target device may send the notification indication to all the first devices, and then transfer the voice call to the first device that first returns the voice call transfer request.

In this implementation, after sending the incoming call notification, the first device determines, based on the detected answer determining operation sent by the user, that the user wants to perform the voice call by using the first device, and sends the voice call transfer request to the target device after the determining. The answer determining operation detected by the first device may be a detected operation such as tapping or touching and holding on a specified key or button on the first device, or may be a detected touch operation such as tapping or sliding on an answer control displayed on a screen of the first device, or may be a voice instruction (for example, a voice instruction "answer the voice call by using the first device" sent by the user is detected) for the incoming call notification detected by the first device and sent by the user. This is not limited in this disclosure.

For example, as shown in FIG. 7, when detecting that an incoming voice call is received as a called party, the mobile phone displays the call application interface on the screen, and sends a notification indication to "Sound box" selected from "Sound box", "Television in the living room", and "Tablet". After receiving the notification indication, "Sound box" sends an incoming call notification "You have a voice call. Do you want to answer the call by using the sound box?". "Sound box" sends a voice call transfer request to the mobile phone after detecting an answer determining operation. The mobile phone triggers the mobile phone to enter a voice call transfer mode when receiving the voice call transfer request. The answer determining operation detected by "Sound box" may be an operation performed by the user on a sound box button, or may be a voice instruction sent by the user to "Sound box". The voice instruction is, for example, "Yes", "Answer", or "Answer by using the sound box".

In a possible implementation, before step S22, the method further includes: The target device determines, based on information about the target device, a first device that meets a voice call transfer condition and a device identifier of the first device before displaying the device identifier. The voice call transfer condition includes: a login account of the first device is the same as a login account of the target device, and the first device has functions of voice data playing and voice data collection.

In a possible implementation, step S24 may include: The target device sends processed first voice data to the first device after performing demodulation and Hi-Fi processing on the received first voice data. That the target device sends processed first voice data to the first device after performing demodulation and Hi-Fi processing on the received first voice data may include: The target device demodulates the first voice data by using a modem, to obtain demodulated first voice data. The target device processes the demodulated first voice data by using a Hi-Fi processing module, to obtain processed first voice data. The target device sends modulated first voice data to the first device after modulating the processed first voice data by using a virtual modem.

In a possible implementation, after step S23 or step S29, the method further includes: The target device establishes WI-FI direct with the first device after triggering the voice call transfer mode. Step S24 may include: The target device sends the first voice data to the first device through the WI-FI direct.

In a possible implementation, the method may further include:

The first device collects data of voice in an environment in which the first device is located, to obtain second voice data.

The first device sends the second voice data to the target device.

The target device forwards the second voice data to the calling party device when receiving the second voice data, so that the calling party device performs voice playing based on the received data.

In a possible implementation, that the target device forwards the second voice data to the calling party device when receiving the second voice data may include: The target device sends processed second voice data to the calling party device after performing demodulation and Hi-Fi processing on the second voice data. That the target device sends processed second voice data to the calling party device after performing demodulation and Hi-Fi processing on the second voice data may include: The target device demodulates the second voice data by using the virtual modem, to obtain demodulated second voice data. The target device processes the demodulated second voice data by using the Hi-Fi processing module, to obtain to-be-modulated second voice data. The target device modulates the to-be-modulated second voice data by using the modem, to obtain processed second voice data, and sends the processed second voice data to the calling party device.

In a possible implementation, that the target device determines, based on information about the target device, a first device that meets a voice call transfer condition and a device identifier of the first device before displaying the device identifier may include:

The target device enables a virtual device management module of the target device before displaying the device identifier.

The target device sends, by using the virtual device management module, a device query request to an intelligent management system in which the target device is located, so that the intelligent management system determines, in response to the device query request, the first device that meets the voice call transfer condition.

The target device receives, by using the virtual device management module, information about the first device that is sent by the intelligent management system, where the information about the first device includes the device identifier of the first device.

The voice call transfer condition further includes: the first device is provided with the virtual device management module.

In a possible implementation, that the target device establishes WI-FI direct with the first device after triggering the voice call transfer mode may include:

The target device enables the virtual modem in the target device by using the virtual device management module, and controls the virtual modem to establish WI-FI direct with the first device.

In a possible implementation, a manner of controlling the virtual modem to establish the WI-FI direct with the first device may include: The target device sends, by using the virtual device management module, a connection request for the first device to the intelligent management system in which the target device is located, so that the intelligent management system invokes a connection interface based on the connection request to establish the WI-FI direct.

In a possible implementation, step S23 may include:

The target device enables a demodulation function and a modulation function of the virtual modem of the target device for audio data by using the virtual device management module, to enable the virtual modem.

When determining that the virtual modem is enabled and the target device is in a voice call state, the target device determines to trigger the target device to enter the voice call transfer mode.

It should be noted that, for specific implementations of the related steps in the voice call transfer method used between the target device and the first device that are provided in FIG. 8 and FIG. 9, correspondingly refer to related descriptions of the voice call transfer method used for the target device. Details are not described herein again.

Figure 10:
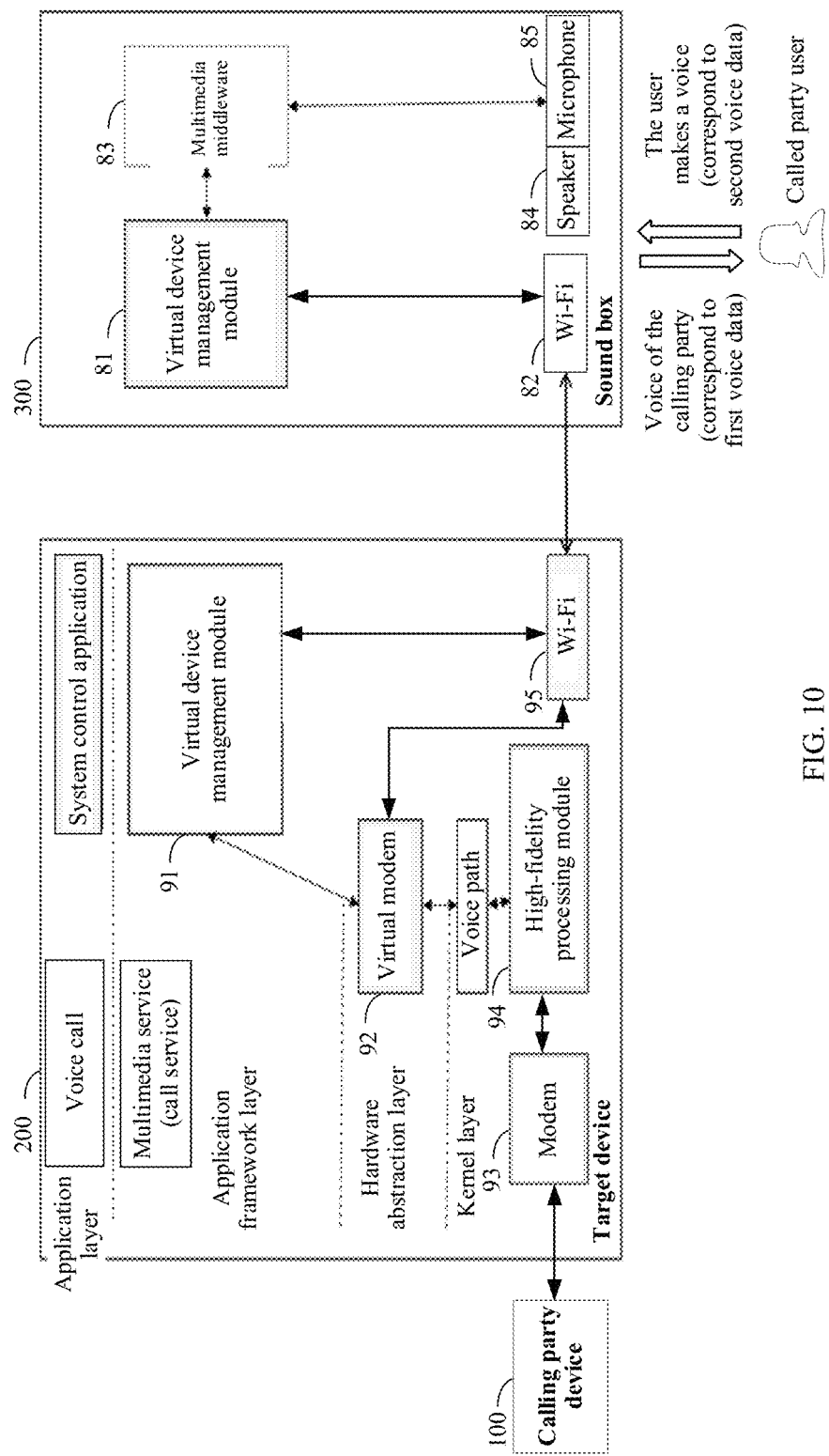
FIG. 10 is a schematic application diagram of a method for performing voice call transfer between a target device and a first device according to an embodiment of this disclosure.

FIG. 10 is a schematic application diagram of a method for performing voice call transfer between a target device and a first device according to an embodiment of this disclosure. As shown in FIG. 10, a calling party user initiates, by using a calling party device 100, a voice call to a target device 200 used by a called party user.

After receiving the incoming voice call, the target device 100 enables a virtual device management module 91 of the target device. The virtual device management module 91 sends a device query request to an intelligent management system in which the target device 200 is located, and receives information (including a device identifier of the first device) about the first device that is returned by the intelligent management system in response to the device query request. The device identifiers Q1, Q2, and Q3 of the first device, the first button Y, and the second button N are displayed on the call application interface of the target device 100 (as shown in FIG. 7).

After receiving a selection operation performed on the device identifier Q1 of "Sound box", the target device 200 triggers the target device 200 to enter a voice call transfer mode. The target device 200 enables a virtual modem 92 by using the virtual device management module 91, and controls the virtual modem 92 to establish WI-FI direct with the sound box 300, and the target device 200 controls each part of the target device 200 to enter the voice call transfer mode.

After the target device 200 receives first voice data sent by the calling party device, the first voice data is sent to the virtual modem 92 through a voice path after being demodulated by a modem 93 and processed by a Hi-Fi processing module 94, and is sent to the sound box 300 through WI-FI direct 95 after being modulated by the virtual modem 92 (for details, refer to related descriptions of the "virtual call downlink"). After the sound box 300 receives the first voice data through WI-FI direct 82, the virtual device management module 81 of the sound box 300 controls a modem of the sound box 300 to demodulate the first voice data, and sends the first voice data to a speaker 84 of the sound box 300 by using multimedia middleware 83. The speaker 84 plays voice of the calling party based on the first voice data.

The sound box 300 receives, by a microphone 85, voice sent by the called party user. The virtual device management module 91 controls the sound box 300 to collect data of the voice sent by the user, so as to obtain second voice data, and sends the second voice data to the target device 200 through the WI-FI direct 82. After the target device 200 receives the second voice data through the WI-FI 95, the second voice data is sent to the calling party 100 after being demodulated by the virtual modem 92, processed by the Hi-Fi processing module 94, and modulated by the modem 93. After receiving the second voice data, the calling device 100 performs voice playing for the calling party user.

In this way, according to the foregoing method, a voice call can be transferred to the first device "Sound box", so that the user needs to perform few operations with great convenience, and voice data transmitted in a voice call process has high quality and a high transmission speed.

This disclosure provides an electronic device. The electronic device may be used as the foregoing target device, and the electronic device includes: a display; one or more processors; and one or more memories.

The one or more memories store one or more computer programs, the one or more computer programs include instructions, and when the instructions are executed by the one or more processors, the electronic device is used as the target device to perform the following steps: when the target device receives an incoming voice call as a called party, displaying, on a display call application interface of the target device, a device identifier of a first device that can perform voice call transfer, where the call application interface further includes a first button used to answer the incoming voice call and a second button used to reject the incoming voice call; receiving a selection operation performed on the device identifier, and triggering the target device to enter a voice call transfer mode; and sending first voice data from the calling party device to the first device when it is determined that the target device performs a voice call with the calling party device and is in the voice call transfer mode, so that the first device plays the first voice data.

In a possible implementation, when the instructions are executed by the one or more processors, the electronic device is used as the target device to perform the following step: determining, based on information about the target device, a first device that meets a voice call transfer condition and a device identifier of the first device before the device identifier is displayed.

The voice call transfer condition includes: a login account of the first device is the same as a login account of the target device, and the first device has functions of voice data playing and voice data collection.

In a possible implementation, when the instructions are executed by the one or more processors, the electronic device is used as the target device to perform the following step: sending processed first voice data to the first device after demodulation and Hi-Fi processing are performed on the received first voice data.

In a possible implementation, when the instructions are executed by the one or more processors, the electronic device is used as the target device to perform the following step: controlling the target device to establish WI-FI direct with the first device after the voice call transfer mode is triggered.

The sending first voice data from the calling party device to the first device includes: sending the first voice data to the first device through the WI-FI direct.

In a possible implementation, when the instructions are executed by the one or more processors, the electronic device is used as the target device to perform the following step: forwarding second voice data to the calling party device when the second voice data is received from the first device, so that the calling party device plays the second voice data.

The second voice data is obtained by the first device by collecting data of voice in an environment in which the first device is located.

In a possible implementation, when the instructions are executed by the one or more processors, the electronic device is used as the target device to perform the following step: sending processed second voice data to the calling party device after demodulation and Hi-Fi processing are performed on the second voice data.

In a possible implementation, when the instructions are executed by the one or more processors, the electronic device is used as the target device to perform the following steps: enabling a virtual device management module of the target device before the device identifier is displayed; sending, by using the virtual device management module, a device query request to an intelligent management system in which the target device is located, so that the intelligent management system determines, in response to the device query request, the first device that meets the voice call transfer condition; and receiving, by using the virtual device management module, information about the first device that is sent by the intelligent management system, where the information about the first device includes the device identifier of the first device.

The voice call transfer condition further includes: the first device is provided with the virtual device management module.

In a possible implementation, when the instructions are executed by the one or more processors, the electronic device is used as the target device to perform the following step: enabling a virtual modem in the target device by using the virtual device management module of the target device, and controlling the virtual modem to establish WI-FI direct with the first device.

In a possible implementation, when the instructions are executed by the one or more processors, the electronic device is used as the target device to perform the following step: sending, by using the virtual device management module, a connection request for the first device to the intelligent management system in which the target device is located, so that the intelligent management system invokes a connection interface based on the connection request to establish the WI-FI direct.

In a possible implementation, when the instructions are executed by the one or more processors, the electronic device is used as the target device to perform the following steps: enabling a demodulation function and a modulation function of the virtual modem of the target device for audio data by using the virtual device management module of the target device, to enable the virtual modem; and when it is determined that the virtual modem is enabled and the target device is in a voice call state, determining to trigger the target device to enter the voice call transfer mode.

In a possible implementation, when the instructions are executed by the one or more processors, the electronic device is used as the target device to perform the following steps: demodulating the first voice data by using a modem of the target device, to obtain demodulated first voice data; processing the demodulated first voice data by using a Hi-Fi processing module of the target device, to obtain processed first voice data; and sending modulated first voice data to the first device after the processed first voice data is modulated by using the virtual modem of the target device.

In a possible implementation, when the instructions are executed by the one or more processors, the electronic device is used as the target device to perform the following steps: demodulating the second voice data by using the virtual modem of the target device, to obtain demodulated second voice data; processing the demodulated second voice data by using the Hi-Fi processing module of the target device, to obtain to-be-modulated second voice data; and modulating the to-be-modulated second voice data by using the modem of the target device, to obtain processed second voice data, and sending the processed second voice data to the calling party device.

This disclosure provides a voice call transfer system. The system includes a target device and a first device.

The target device includes: a display; one or more first processors; and one or more first memories.

The one or more first memories store one or more computer programs, the one or more computer programs include instructions, and when the instructions are executed by the one or more first processors, the target device is enabled to perform the following steps:

The target device receives an incoming voice call as a called party.

A device identifier of the first device that can perform voice call transfer is displayed on a call application interface of the target device, where the call application interface further includes a first button used to answer the incoming voice call and a second button used to reject the incoming voice call.

The target device receives a selection operation performed on the device identifier, and triggers the target device to enter a voice call transfer mode.

The target device sends first voice data from a calling party device to the first device when the target device performs a voice call with the calling party device and is in the voice call transfer mode.

The first device includes: one or more second processors; and one or more second memories.

The one or more second memories store one or more computer programs, the one or more computer programs include instructions, and when the instructions are executed by the one or more second processors, the first device is enabled to perform the following step:

The first device receives and plays the first voice data.

In a possible implementation, when the instructions are executed by the one or more first processors, the target device is enabled to perform the following step: The target device sends a notification indication to a pre-determined first device after detecting that the target device receives the incoming voice call as the called party.

When the instructions are executed by the one or more second processors, the first device is enabled to perform the following steps:

The first device sends an incoming call notification in response to the notification indication.

The first device sends a voice call transfer request to the target device in response to a detected answer determining operation.

When the instructions are executed by the one or more first processors, the target device is enabled to perform the following step: The target device triggers the target device to enter the voice call transfer mode when receiving the voice call transfer request.

In a possible implementation, when the instructions are executed by the one or more first processors, the target device is enabled to perform the following step:

The target device determines, based on information about the target device, a first device that meets a voice call transfer condition and a device identifier of the first device before displaying the device identifier.

The voice call transfer condition includes: a login account of the first device is the same as a login account of the target device, and the first device has functions of voice data playing and voice data collection.

In a possible implementation, when the instructions are executed by the one or more first processors, the target device is enabled to perform the following step:

The target device sends processed first voice data to the first device after performing demodulation and Hi-Fi processing on the received first voice data.

In a possible implementation, when the instructions are executed by the one or more first processors, the target device is enabled to perform the following step:

The target device establishes WI-FI direct with the first device after triggering the voice call transfer mode, so that the target device sends the first voice data to the first device through the WI-FI direct.

In a possible implementation, when the instructions are executed by the one or more second processors, the first device is enabled to perform the following steps:

The first device collects data of voice in an environment in which the first device is located, to obtain second voice data.

The first device sends the second voice data to the target device.

When the instructions are executed by the one or more first processors, the target device is enabled to perform the following step:

The target device forwards the second voice data to the calling party device when receiving the second voice data, so that the calling party device plays the second voice data.

In a possible implementation, when the instructions are executed by the one or more first processors, the target device is enabled to perform the following step:

The target device sends processed second voice data to the calling party device after performing demodulation and Hi-Fi processing on the second voice data.

In a possible implementation, when the instructions are executed by the one or more first processors, the target device is enabled to perform the following steps:

The target device enables a virtual device management module of the target device before displaying the device identifier.

The target device sends, by using the virtual device management module, a device query request to an intelligent management system in which the target device is located, so that the intelligent management system determines, in response to the device query request, the first device that meets the voice call transfer condition.

The target device receives, by using the virtual device management module, information about the first device that is sent by the intelligent management system, where the information about the first device includes the device identifier of the first device.

The voice call transfer condition further includes: the first device is provided with the virtual device management module.

In a possible implementation, when the instructions are executed by the one or more first processors, the target device is enabled to perform the following step:

The target device enables a virtual modem in the target device by using the virtual device management module, and controls the virtual modem to establish WI-FI direct with the first device.

In a possible implementation, when the instructions are executed by the one or more first processors, the target device is enabled to perform the following step:

The target device sends, by using the virtual device management module, a connection request for the first device to the intelligent management system in which the target device is located, so that the intelligent management system invokes a connection interface based on the connection request to establish the WI-FI direct.

In a possible implementation, when the instructions are executed by the one or more first processors, the target device is enabled to perform the following steps:

The target device enables a demodulation function and a modulation function of the virtual modem of the target device for audio data by using the virtual device management module, to enable the virtual modem.

When determining that the virtual modem is enabled and the target device is in a voice call state, the target device determines to trigger the target device to enter the voice call transfer mode.

In a possible implementation, when the instructions are executed by the one or more first processors, the target device is enabled to perform the following steps:

The target device demodulates the first voice data by using a modem, to obtain demodulated first voice data.

The target device processes the demodulated first voice data by using a Hi-Fi processing module, to obtain processed first voice data.

The target device sends modulated first voice data to the first device after modulating the processed first voice data by using the virtual modem.

In a possible implementation, when the instructions are executed by the one or more first processors, the target device is enabled to perform the following steps:

The target device demodulates the second voice data by using the virtual modem, to obtain demodulated second voice data.

The target device processes the demodulated second voice data by using the Hi-Fi processing module, to obtain to-be-modulated second voice data.

The target device modulates the to-be-modulated second voice data by using the modem, to obtain processed second voice data, and sends the processed second voice data to the calling party device.

This disclosure further provides a voice call transfer apparatus. The apparatus is configured to perform the foregoing voice call transfer method. The apparatus includes at least one function module to implement the foregoing method.

This disclosure further provides an apparatus for performing voice call transfer between a target device and a first device. The apparatus is configured to perform the foregoing method for performing the voice call transfer between the target device and the first device. The apparatus includes at least one function module to implement the foregoing method.

This disclosure further provides a computer storage medium, including computer instructions. When the computer instructions are run on a mobile device, the mobile device is enabled to perform the foregoing voice call transfer method.

This disclosure further provides a computer storage medium, including computer instructions. When the computer instructions are run on a mobile device, the mobile device is enabled to perform the foregoing method for performing the voice call transfer between the target device and the first device.

This disclosure further provides a computer program product. When the computer program product runs on a computer, the computer is enabled to perform the foregoing voice call transfer method.

This disclosure further provides a computer program product. When the computer program product runs on a computer, the computer is enabled to perform the foregoing method for performing the voice call transfer between the target device and the first device.

It should be noted that although the foregoing embodiments are used as examples to describe the voice call transfer and apparatus, a person skilled in the art can understand that this disclosure should be not limited thereto. In fact, a user can completely flexibly set steps and modules according to a personal preference and/or an actual application scenario, provided that the steps and modules comply with the technical solutions of this disclosure.

This application may be a system, a method, and/or a computer program product. The computer program product may include a computer-readable storage medium, having computer-readable program instructions thereon for causing a processor to carry out various aspects of this disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage media include: a portable computer disk, a hard disk, a random-access memory (RAM), a read-only memory (ROM), an erasable programmable read-only memory (EPROM or flash memory), a static random-access memory (SRAM), a portable compact disk read-only memory (CD-ROM), a digital versatile disk (DVD), a memory stick, a floppy disk, a mechanical encoded device such as a punched card or a groove protrusion structure storing instructions on the punched card or the groove protrusion structure, and any suitable combination of the foregoing. The computer-readable storage medium used herein is not to be construed as a transient signal, such as a radio wave or another freely propagating electromagnetic wave, an electromagnetic wave propagating through a waveguide or another transmission medium (such as a light pulse through a fiber optic cable), or an electrical signal transmitted through a wire.

The computer-readable program instructions described herein may be downloaded from the computer-readable storage medium to respective computing/processing devices or to an external computer or external storage device through a network such as the internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform operations in this disclosure may be an assembly instruction, an instruction set architecture (ISA) instruction, a machine instruction, a machine-related instruction, microcode, a firmware instruction, status setting data, or source code or target code written in any combination of one or more programming languages. The programming languages include an object-oriented programming language such as Smalltalk and C++, and a procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer through any type of network, including a local area network (LAN) or a wide area network (WAN), or may be connected to an external computer (for example, connected by using an internet service provider through the internet). In some embodiments, an electronic circuit, for example, a programmable logic circuit, a field-programmable gate array (FPGA), or a programmable logic array (PLA), is customized by using status information of the computer-readable program instructions. The electronic circuit may execute the computer-readable program instructions, so as to implement the various aspects of this disclosure.

The various aspects of this disclosure are described herein with reference to the flowcharts and/or block diagrams of the method, the apparatus (system), and the computer program product according to embodiments of this disclosure. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the other programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the other programmable data processing apparatus, or the other device to produce a computer-implemented process. Therefore, the instructions executed on the computer, the other programmable data processing apparatus, or the other device implements the functions/acts specified in the one or more blocks in the flowcharts and/or block diagrams.

The flowcharts and block diagrams in the accompanying drawings show the system architecture, function, and operation of possible implementations of systems, methods, and computer program products according to various embodiments of this disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may, in fact, be executed substantially in parallel, and may sometimes be executed in a reverse order, depending on a function involved. It should also be noted that each block in the block diagrams and/or flowcharts, and the combination of the blocks in the block diagrams and/or flowcharts may be implemented by a special-purpose hardware-based system that performs a specified function or act, or may be implemented by a combination of special-purpose hardware and computer instructions.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A voice call transfer method implemented by a target device, wherein the voice call transfer method comprises:
receiving an incoming voice call as a called party;
displaying, in response to receiving the incoming voice call and on a call application interface of the target device, a device identifier of a first device that can perform a voice call transfer, wherein the call application interface further comprises a first button to answer the incoming voice call and a second button to reject the incoming voice call;

receiving a selection operation performed on the device identifier;

triggering, in response to receiving the selection operation, the target device to enter a voice call transfer mode; and sending first voice data from a calling party device to the first device when the target device performs a voice call with the calling party device and when the target device is in the voice call transfer mode to instruct the first device to play the first voice data.

2. The voice call transfer method of claim 1, further comprising determining, based on information about the target device and before the device identifier is displayed, the device identifier and the first device that meets a voice call transfer condition, wherein the voice call transfer condition comprises a first login account of the first device is the same as a second login account of the target device, and the first device has functions of voice data playing and voice data collection.

3. The voice call transfer method of claim 2, wherein determining the device identifier and the first device comprises:

enabling a virtual device management module of the target device before the device identifier is displayed;

sending, by using the virtual device management module, a device query request to an intelligent management system in which the target device is located to instruct the intelligent management system to determine, in response to the device query request, the first device that meets the voice call transfer condition; and receiving, by using the virtual device management module, information about the first device from the intelligent management system, wherein the information comprises the device identifier, and wherein the voice call transfer condition further comprises the first device is provided with the virtual device management module.

4. The voice call transfer method of claim 1, wherein sending the first voice data comprises:

performing demodulation and high-fidelity (Hi-Fi) processing on the first voice data to obtain processed first voice data; and sending the processed first voice data to the first device.

5. The voice call transfer method of claim 4, wherein sending the processed first voice data comprises:

demodulating, by using a modem of the target device, the first voice data to obtain demodulated first voice data;

processing, by using a high-fidelity (Hi-Fi) processing module of the target device, the demodulated first voice data to obtain the processed first voice data;

modulating, by using a virtual modem of the target device, the processed first voice data to obtain modulated first voice data; and sending the modulated first voice data to the first device.

6. The voice call transfer method of claim 1, wherein after the voice call transfer mode is triggered, the voice call transfer method further comprises establishing WI-FI direct with the first device, and wherein sending the first voice data comprises sending the first voice data to the first device through the Wi-Fi direct.

7. The voice call transfer method of claim 6, wherein establishing the WI-FI direct comprises:

enabling, using a virtual device management module of the target device, a virtual modem in the target device; and controlling the virtual modem to establish the WI-FI direct.

8. The voice call transfer method of claim 7, wherein establishing the WI-FI direct comprises sending, by using the virtual device management module, a connection request for the first device to an intelligent management system in which the target device is located to instruct the intelligent management system to invoke, based on the connection request, a connection interface to establish the WI-FI direct.

9. The voice call transfer method of claim 1, further comprising:

receiving second voice data from the first device, wherein the second voice data is from an environment in which the first device is located; and forwarding the second voice data to the calling party device.

10. The voice call transfer method of claim 9, further comprising performing demodulation and high-fidelity (Hi-Fi) processing on the second voice data to obtain processed second voice data, wherein forwarding the second voice data comprises sending the processed second voice data to the calling party.

11. The voice call transfer method of claim 10, wherein sending the processed second voice data comprises:

demodulating, by using a virtual modem of the target device, the second voice data to obtain demodulated second voice data;

processing, by using a high-fidelity (Hi-Fi) processing module of the target device, the demodulated second voice data to obtain to-be-modulated second voice data;

modulating, by using a modem of the target device, the to-be-modulated second voice data to obtain the processed second voice data; and sending the processed second voice data to the calling party device.

12. The voice call transfer method of claim 1, wherein triggering the target device comprises:

enabling a demodulation function and a modulation function of a virtual modem of the target device for audio data by using a virtual device management module of the target device to enable the virtual modem; and determining to trigger the target device when the virtual modem is enabled and the target device is in a voice call state.

13. A voice call transfer system, comprising:

a target device comprising:
 a processor;
 a display coupled to the processor; and
 a memory coupled to the processor and configured to store instructions that, when executed by the processor, cause the target device to:
  receive an incoming voice call as a called party;
  display, in response to receiving the incoming voice call and on a call application interface of the target device, a device identifier of a first device that can perform a voice call transfer, wherein the call application interface further comprises a first button to answer the incoming voice call and a second button to reject the incoming voice call;
  receive a selection operation performed on the device identifier;
  trigger, in response to receiving the selection operation, the target device to enter a voice call transfer mode; and send first voice data from a calling party device to the first device when the target device performs a voice call with the calling party device and when the target device is in the voice call transfer mode to instruct the first device to play the first voice data.

14. The voice call transfer system of claim 13, wherein the instructions further cause the target device to:
   send a notification indication to the first device after detecting that the target device receives the incoming voice call;
   send, by the first device, an incoming call notification in response to the notification indication;
   receive a voice call transfer request from the first device; and
   trigger, in response to receiving the voice call transfer request, the target device to enter the voice call transfer mode.

15. The voice call transfer system of claim 13, wherein the instructions further cause the target device to determine, based on information about the target device and before the device identifier is displayed, the device identifier and the first device that meets a voice call transfer condition, wherein the voice call transfer condition comprises a first login account of the first device is the same as a second login account of the target device, and the first device has functions of voice data playing and voice data collection.

16. The voice call transfer system of claim 15, wherein the instructions further cause the target device to:
   enable a virtual device management module of the target device before displaying the device identifier;
   send, by using the virtual device management module, a device query request to an intelligent management system in which the target device is located to instruct the intelligent management system to determine, in response to the device query request, the first device that meets the voice call transfer condition; and
   receive, by using the virtual device management module, information about the first device from the intelligent management system,
   wherein the information comprises the device identifier, and
   wherein the voice call transfer condition further comprises the first device is provided with the virtual device management module.

17. The voice call transfer system of claim 13, wherein the instructions further cause the target device to:
   receive second voice data from the first device, wherein the second voice data is from an environment in which the first device is located; and
   forward the second voice data to the calling party device, when receiving the second voice data, so that the calling party device plays the second voice data.

18. The voice call transfer system of claim 13, wherein the instructions further cause the target device to:
   enable a demodulation function and a modulation function of a virtual modem of the target device for audio data by using a virtual device management module to enable the virtual modem; and
   determine to trigger the target device when the virtual modem is enabled and the target device is in a voice call state.

19. A computer program product comprising instructions stored on a non-transitory computer-readable medium that, when executed by a processor, cause a target device to:
   receive an incoming voice call as a called party;
   display, in response to receiving the incoming voice call and on a call application interface of the target device, a device identifier of a first device that can perform a voice call transfer, wherein the call application interface further comprises a first button to answer the incoming voice call and a second button to reject the incoming voice call;
   receive a selection operation performed on the device identifier;
   trigger, in response to receiving the selection operation, the target device to enter a voice call transfer mode; and
   send first voice data from a calling party device to the first device when the target device performs a voice call with the calling party device and when the target device is in the voice call transfer mode to instruct the first device to play the first voice data.

20. The computer program product of claim 19, wherein the instructions further cause the target device to determine, based on information about the target device and before the device identifier is displayed, the first device that meets a voice call transfer condition and the device identifier, and wherein the voice call transfer condition comprises a first login account of the first device is the same as a second login account of the target device, and the first device has functions of voice data playing and voice data collection.

* * * * *